(12) United States Patent
Aikawa et al.

(10) Patent No.: US 10,625,570 B2
(45) Date of Patent: *Apr. 21, 2020

(54) CONTROL APPARATUS OF HEAT EXCHANGING SYSTEM

(71) Applicant: TOYOTA JIDOSHA KABUSHIKI KAISHA, Toyota-shi, Aichi-ken (JP)

(72) Inventors: Hidefumi Aikawa, Sunto-gun (JP); Yoichi Ogura, Sunto-gun (JP); Yuji Miyoshi, Susono (JP); Masatoshi Yano, Hadano (JP); Yu Ofune, Kariya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 16 days.

This patent is subject to a terminal disclaimer.

(21) Appl. No.: 16/027,569

(22) Filed: Jul. 5, 2018

(65) Prior Publication Data
US 2019/0009642 A1 Jan. 10, 2019

(30) Foreign Application Priority Data

Jul. 10, 2017 (JP) .................................. 2017-134505

(51) Int. Cl.
*G05D 23/00* (2006.01)
*B60H 1/00* (2006.01)
(Continued)

(52) U.S. Cl.
CPC ..... *B60H 1/00885* (2013.01); *B60H 1/00892* (2013.01); *B60H 1/03* (2013.01);
(Continued)

(58) Field of Classification Search
CPC .. B60H 1/00885; B60H 1/00892; B60H 1/03; F01P 3/18; F01P 3/20; F01P 5/10; F01P 7/165; F01P 2007/146; F01P 2060/08

USPC ......................................................... 165/296
See application file for complete search history.

(56) References Cited

U.S. PATENT DOCUMENTS

| 4,381,736 A | 5/1983 | Hirayama |
| 2017/0253104 A1 | 9/2017 | Amano et al. |

(Continued)

FOREIGN PATENT DOCUMENTS

| JP | 2007-223418 | 9/2007 |
| JP | 2008-049876 A | 3/2008 |

(Continued)

OTHER PUBLICATIONS

Notice of Allowance issued in U.S. Appl. No. 16/027,586 dated Oct. 21, 2019.

(Continued)

*Primary Examiner* — Davis D Hwu
(74) *Attorney, Agent, or Firm* — Finnegan, Henderson, Farabow, Garrett & Dunner, LLP

(57) ABSTRACT

A control apparatus according to the invention is applied to a heat exchanging system comprising a connection system for connecting an engine water passage for heat exchanging water for cooling an internal combustion engine and the heater water passage for the heat exchanging water for heating a heater core to each other. The apparatus activates the connection system to connect the engine water passage to the heater water passage when a temperature of the heat exchanging water circulating through the engine water passage, is equal to or higher than the temperature of the heat exchanging water circulating through the heater water passage, and an interior of a vehicle is requested to be warmed up.

10 Claims, 25 Drawing Sheets

(51) Int. Cl.
| | | |
|---|---|---|
| *F01P 3/20* | (2006.01) | |
| *F01P 5/10* | (2006.01) | |
| *F01P 7/16* | (2006.01) | |
| *B60H 1/03* | (2006.01) | |
| *F01P 3/18* | (2006.01) | |
| *B60H 1/04* | (2006.01) | |
| *F01P 7/14* | (2006.01) | |

(52) U.S. Cl.
CPC .................. *B60H 1/04* (2013.01); *F01P 3/18* (2013.01); *F01P 3/20* (2013.01); *F01P 5/10* (2013.01); *F01P 7/165* (2013.01); *F01P 2007/146* (2013.01); *F01P 2060/08* (2013.01)

(56) References Cited

U.S. PATENT DOCUMENTS

| | | | |
|---|---|---|---|
| 2017/0326945 | A1 | 11/2017 | Hatakeyama et al. |
| 2018/0238223 | A1 | 8/2018 | Enomoto et al. |
| 2018/0339574 | A1 | 11/2018 | Sugimura et al. |
| 2019/0009643 | A1* | 1/2019 | Yano .................. B60H 1/00892 |
| 2019/0009646 | A1* | 1/2019 | Aikawa .............. B60H 1/00885 |

FOREIGN PATENT DOCUMENTS

| | | |
|---|---|---|
| JP | 2016-053342 A | 4/2016 |
| JP | 2016-107979 | 6/2016 |
| JP | 2017-048783 A | 3/2017 |
| WO | WO2017/056868 A | 4/2017 |

OTHER PUBLICATIONS

Notice of Allowance issued in U.S. Appl. No. 16/027,586 dated Jan. 14, 2020.

* cited by examiner

CONTROL APPARATUS OF HEAT EXCHANGING SYSTEM

BACKGROUND

Field

The invention relates to a control apparatus of a heat exchanging system including a heater core heating system for heating a heater core for heating air supplied to an interior of a vehicle for warming up the interior of the vehicle by heat exchanging water, and an engine cooling system for cooling an internal combustion engine by the heat exchanging water.

Description of the Related Art

A control apparatus of the heat exchanging system including the heater core heating system and the engine cooling system is known (for example, see JP 2016-107979 A). The heater core heating system of the known heat exchanging system includes a heater water passage, through which the heat exchanging water flows, and a heater pump for circulating the heat exchanging water through the heater water passage. Further, the engine cooling system of the known heat exchanging system includes an engine water passage, through which the heat exchanging water flows, and an engine pump for circulating the heat exchanging water through the engine water passage.

Further, the known heat exchanging system includes a connection system for connecting the engine water passage and the heater water passage to each other.

The known control apparatus applied to the known heat exchanging system separates the heater water passage from the engine water passage when a temperature of the heat exchanging water for cooling the internal combustion engine, is lower than a predetermined temperature.

On the other hand, when the temperature of the heat exchanging water for cooling the internal combustion engine, is equal to or higher than the predetermined temperature, the known control apparatus is configured to connect the engine water passage to the heater water passage to supply the heat exchanging water having a temperature increased by cooling the engine, thereby heating the heater core by heat of the heat exchanging water.

The predetermined temperature is set, independently of the temperature of the heat exchanging water flowing through the heater water passage. Thus, depending on the predetermined temperature, the temperature of the heat exchanging water flowing into the heater water passage from the engine water passage by connecting the engine water passage to the heater water passage, may be lower than the temperature of the heat exchanging water flowing through the heater water passage before the engine water passage is connected to the heater water passage.

Thus, the temperature of the heat exchanging water supplied to the heater core may decrease when the engine water passage is connected to the heater water passage. As a result, a temperature of the heater core may decrease. When the temperature of the heater core decreases, a temperature of air (warmed air) supplied to the interior of the vehicle may decrease. As a result, persons in the vehicle may feel discomfort.

SUMMARY

The invention has made for solving the above-described problems. An object of the invention is to provide a control apparatus of the heat exchanging system capable of connecting the engine water passage to the heater water passage while preventing the temperature of the heater core from decreasing.

The control apparatus according to the invention is applied to a heat exchanging system comprising a heater core heating system (30, 30A), an engine cooling system (10), and a connection system (60).

The heater core heating system (30: 30A) heats a heater core (31) for heating air supplied to an interior of a vehicle to warm up the interior of the vehicle by heat exchanging water. The heater core heating system (30, 30A) includes a heater water passage (40, 33W 41, 31W, 42, 43, 34W, 44, 45, 46), through which the heat exchanging water circulates, a heat exchanger (33, 34) for heating the heat exchanging water circulating the heater water passage (40, 33W 41, 31W, 42, 43, 34W, 44, 45, 46), and a heater pump (32) for circulating the heat exchanging water through the heater water passage (40, 33W 41, 31W, 42, 43, 34W, 44, 45, 46).

The engine cooling system (10) cools an internal combustion engine (11) by the heat exchanging water. The engine cooling system (10) includes an engine water passage (16, 11W, 17, 18, 12W, 19), through which the heat exchanging water circulates, and an engine pump (15) for circulating the heat exchanging water through the engine water passage (16, 11W, 17, 18, 12W, 19).

The connection system (60) connects the engine water passage (16, 11W, 17, 18, 12W, 19) and the heater water passage (40, 33W 41, 31W, 42, 43, 34W, 44, 45, 46) to each other such that the heat exchanging water flows into the heater water passage (40, 33W 41, 31W, 42, 43, 34W, 44, 45, 46) from the engine water passage (16, 11W, 17, 18, 12W, 19), and the heat exchanging water flows out from the heater water passage (40, 33W 41, 31W, 42, 43, 34W, 44, 45, 46) to the engine water passage (16, 11W, 17, 18, 12W, 19).

The control apparatus comprises an electronic control unit (90). The electronic control unit (90) is configured to activate the heater pump (32) (see a process of a step 1150 in FIG. 11) when warm-up condition that the interior of the vehicle is requested to be warmed up, is satisfied (a determination "Yes" at a step 1220 in FIG. 12). The electronic control unit (90) is configured to activate the connection system (60) to connect the engine water passage (16, 11W, 17, 18, 12W, 19) to the heater water passage (40, 33W 41, 31W, 42, 43, 34W, 44, 45, 46) (see a process of a step 1130 in FIG. 11) when a temperature of the heat exchanging water circulating through the engine water passage (16, 11W, 17, 18, 12W, 19), is equal to or higher than the temperature of the heat exchanging water circulating through the heater water passage (40, 33W 41, 31W, 42, 43, 34W, 44, 45, 46), and the warm-up condition is satisfied while the engine water passage (16, 11W, 17, 18, 12W, 19) is not connected to the heater water passage (40, 33W 41, 31W, 42, 43, 34W, 44, 45, 46) (see a determination "Yes" at a step 1110 in FIG. 11).

When the engine water passage is connected to the heater water passage while the temperature of the heat exchanging water circulating through the engine water passage, is lower than the temperature of the heat exchanging water circulating through the heater water passage, the temperature of the heat exchanging water supplied to the heater core decreases. As a result, the temperature of the heater core decreases. In this case, the temperature of the air (the warm air) supplied to the interior of the vehicle may decrease. As a result, the persons in the vehicle may feel discomfort.

According to the invention, the engine water passage is connected to the heater water passage when the temperature of the heat exchanging water circulating through the engine water passage, is equal to or higher than the temperature of the heat exchanging water circulating through the heater water passage. Therefore, when the engine water passage is connected to the heater water passage, the temperature of the heat exchanging water supplied to the heater core may be prevented from decreasing. As a result, the temperature of the heater core may be prevented from decreasing. Thus, the temperature of the air (the warm air) supplied to the interior of the vehicle may be prevented from decreasing. As a result, the persons in the vehicle are unlikely to feel discomfort.

According to an aspect of the invention, the electronic control unit (90) may be configured to activate the engine pump (15) and activate the connection system (60) to connect the engine water passage (16, 11W, 17, 18, 12W, 19) to the heater water passage (40, 33W 41, 31W, 42, 43, 34W, 44, 45, 46) when the temperature of the heat exchanging water circulating through the engine water passage (16, 11W, 17, 18, 12W, 19), is equal to or higher than the temperature of the heat exchanging water circulating through the heater water passage (40, 33W 41, 31W, 42, 43, 34W, 44, 45, 46), the warm-up condition is satisfied, and a circulation of the heat exchanging water through the engine water passage (16, 11W, 17, 18, 12W, 19) is requested while the engine water passage (16, 11W, 17, 18, 12W, 19) is not connected to the heater water passage (40, 33W 41, 31W, 42, 43, 34W, 44, 45, 46).

When the engine water passage is connected to the heater water passage while the engine pump is not activated, only the heater pump circulates the heat exchanging water through the engine water passage and the heater water passage. In this case, a load of the heater pump may increase excessively. According to this aspect of the invention, the engine water passage is connected to the heater water passage when the engine pump is activated. Thus, the load of the heater pump may be prevented from increasing excessively when the engine water passage is connected to the heater water passage.

According to a further aspect of the invention, the electronic control unit (90) may be configured to determine that the circulation of the heat exchanging water through the engine water passage (16, 11W, 17, 18, 12W, 19), is requested when the temperature of the heat exchanging water in an engine inner water passage (11W) is equal to or higher than a predetermined water temperature. In this aspect, the engine inner water passage (11W) is formed in the internal combustion engine (11) and defines a part the engine water passage (16, 11W, 17, 18, 12W, 19). When the temperature of the heat exchanging water increases excessively in the engine inner water passage, the heat exchanging water may boil in the engine inner water passage. According to this aspect of the invention, when the temperature of the heat exchanging water in the engine inner water passage is equal to or higher than the predetermined water temperature, the engine pump is activated. Thus, the temperature of the heat exchanging water may be prevented from increasing in the engine inner water passage. As a result, the heat exchanging water may be prevented from boiling in the engine inner water passage.

According to a further aspect of the invention, the electronic control unit (90) may be configured to determine that the circulation of the heat exchanging water through the engine water passage (16, 11W, 17, 18, 12W, 19), is requested when a temperature difference between temperatures of parts of the internal combustion engine (11), is equal to or larger than a predetermined temperature difference. When the temperature difference is generated in the internal combustion engine, strain may be generated in the engine. According to this aspect of the invention, when the temperature difference in the engine is equal to or larger than the predetermined temperature difference, the engine pump is activated. Thus, the temperature difference may be prevented from being generated in the engine. As a result, the strain may be prevented from being generated in the engine.

According to a further aspect of the invention, the electronic control unit (90) may be configured to determine that the circulation of the heat exchanging water through the engine water passage (16, 11W, 17, 18, 12W, 19), is requested when the temperature of the heat exchanging water in an engine inner water passage (11W) is equal to or higher than a predetermined water temperature, and a temperature difference between temperatures of parts of the internal combustion engine (11), is equal to or larger than a predetermined temperature difference. In this aspect, the engine inner water passage (11W) is formed in the internal combustion engine (11) and defines a part of the engine water passage (16, 11W, 17, 18, 12W, 19).

According to a further aspect of the invention, the electronic control unit (90) may be configured to acquire a difference between a temperature of the heat exchanging water cooling an upper area of a cylinder bore a temperature of the heat exchanging water cooling a lower area of the cylinder bore as the temperature difference. In this aspect, the cylinder bore defines a combustion chamber of the internal combustion engine (11).

According to a further aspect of the invention, the electronic control unit (90) may be configured to activate the connection system (60) to connect the engine water passage (16, 11W, 17, 18, 12W, 19) to the heater water passage (40, 33W 41, 31W, 42, 43, 34W, 44, 45, 46) when the temperature of the heat exchanging water circulating through the engine water passage (16, 11W, 17, 18, 12W, 19), is equal to or higher than the temperature of the heat exchanging water circulating through the heater water passage (40, 33W 41, 31W, 42, 43, 34W, 44, 45, 46), the warm-up condition is satisfied, and a flow rate of the heat exchanging water circulating through the engine water passage (16, 11W, 17, 18, 12W, 19) is equal to or larger than a flow rate of the heat exchanging water circulating through the heater water passage (40, 33W 41, 31W, 42, 43, 34W, 44, 45, 46). When the engine water passage is connected to the heater water passage while the flow rate of the heat exchanging water circulating through the engine water passage is smaller than the flow rate of the heat exchanging water circulating through the heater water passage, the flow rate of the heat exchanging water supplied to the heater core decreases. As a result, the temperature of the heater core may decrease. In this case, the temperature of the air (the warm air) supplied to the interior of the vehicle may decrease. As a result, the persons in the vehicle may feel discomfort. According to this aspect of the invention, the engine water passage is connected to the heater water passage when the flow rate of the heat exchanging water circulating the engine water passage is equal to or larger than the flow rate of the heat exchanging water circulating through the heater water passage. Therefore, the flow rate of the heat exchanging water supplied to the heater core is unlikely to decrease when the engine water passage is connected to the heater wall passage. Thus, the temperature of the air (the warm air) supplied to the interior of the vehicle may be prevented from decreasing. As a result, the persons in the vehicle are unlikely to feel discomfort.

According to a further aspect of the invention, the engine cooling system (10) may include a radiator (12) in the engine water passage (16, 11W, 17, 18, 12W, 19). In this aspect, the radiator (12) cools the heat changing water circulating through the engine water passage (16, 11W, 17, 18, 12W, 19). Further, in this aspect, the connection system (60) may be configured to connect the engine water passage (16, 11W, 17, 18, 12W, 19) and the heater water passage (40, 33W 41, 31W, 42, 43, 34W, 44, 45, 46) such that the heat exchanging water flowing in the engine water passage (17, 18) downstream of the internal combustion engine (11) and upstream of the radiator (12), flows into the heater water passage (40, 33W 41, 31W, 42, 43, 34W, 44, 45, 46).

According to a further aspect of the invention, the heater core heating system (30, 30A) may include a heat pump (33) in the heater water passage (40, 33W 41, 31W, 42, 43, 34W, 44, 45, 46). In this aspect, the heat pump (33) heats the heat changing water circulating through the heater water passage (40, 33W 41, 31W, 42, 43, 34W, 44, 45, 46). Further, in this aspect, the connection system (60) may be configured to connect the engine water passage (16, 11W, 17, 18, 12W, 19) and the heater water passage (40, 33W 41, 31W, 42, 43, 34W, 44, 45, 46) such that the heat exchanging water flowing through the engine water passage (16, 11W, 17, 18, 12W, 19), flows into the heater water passage (40, 42, 43, 44, 45, 46) downstream of the heater core (31) and upstream of the heat pump (33).

According to a further aspect of the invention the engine cooling system (10) may include a radiator (12) in the engine water passage (16, 11W, 17, 18, 12W, 19). In this aspect, the radiator (12) cools the heat changing water circulating through the engine water passage (16, 11W, 17, 18, 12W, 19). Further, in this aspect, the heater core heating system (30, 30A) may include a heat pump (33) in the heater water passage (40, 33W 41, 31W, 42, 43, 34W, 44, 45, 46). In this aspect, the heat pump (33) heats the heat changing water circulating through the heater water passage (40, 33W 41, 31W, 42, 43, 34W, 44, 45, 46). Further, in this aspect, the connection system (60) may be configured to connect the engine water passage (16, 11W, 17, 18, 12W, 19) and the heater water passage (40, 33W 41, 31W, 42, 43, 34W, 44, 45, 46) such that the heat exchanging water flowing in the engine water passage (17, 18) downstream of the internal combustion engine (11) and upstream of the radiator (12), flows into the heater water passage (40, 42, 43, 44, 45, 46) downstream of the heater core (31) and upstream of the heat pump (33).

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features, and accompanied advantages of the present invention can be easily understood from the description of the embodiment of the present invention along with the drawings.

DESCRIPTION OF THE PREFERRED EMBODIMENTS

Figure 1:
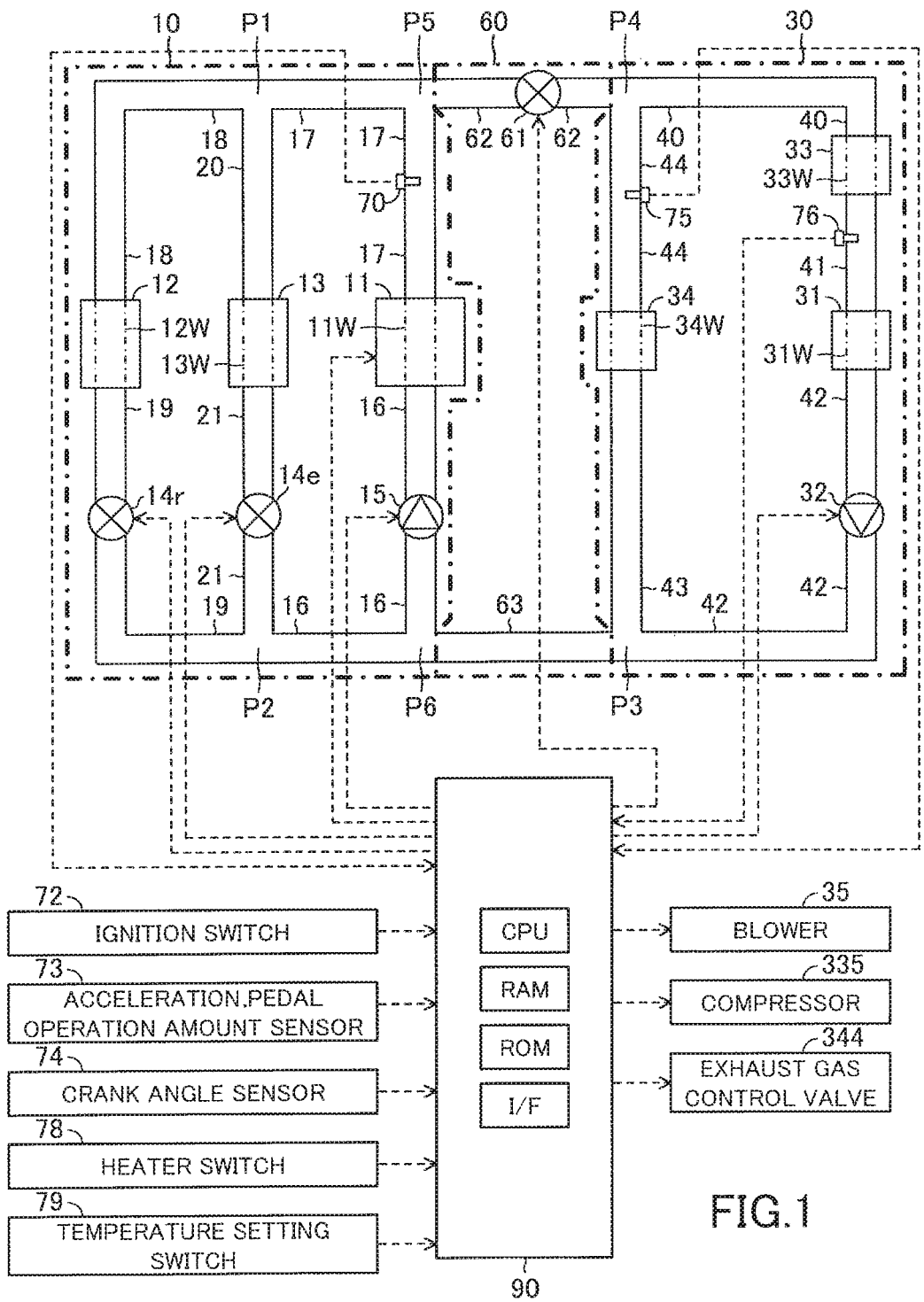
FIG. 1 is a view for showing a heat exchanging system, to which a control apparatus according to the first embodiment of the invention is applied.

Below, a control apparatus of a heat exchanging system according to embodiments of the invention, will be described with reference to the drawings. As shown in FIG. 1, the heat exchanging system, to which the control apparatus according to the first embodiment of the invention is applied, includes an engine cooling system 10 and a heater core heating system 30. The cooling system 10 cools an internal combustion engine 11 by heat exchanging water. The heating system 30 heats a heater core 31 by the heat exchanging water. Hereinafter, the control apparatus according to the first embodiment will be referred to as "the first embodiment apparatus".

The cooling system 10 includes an engine water passage for circulating the heat exchanging water. The heating system 30 includes a heater water passage for circulating the heat exchanging water.

The heat exchanging system includes a connection system 60 for connecting the engine water passage and the heater water passage to each other. Hereinafter, an operation for connecting the engine water passage and the heater water passage to each other, will be referred to as "the system connection operation".

The cooling system 10 includes an engine inner water passage 11W, a radiator 12, an EGR cooler 13, a radiator flow rate control valve 14r, an EGR cooler flow rate control valve 14e, an engine water pump 15, an engine inflow water passage 16, an engine outflow water passage 17, a radiator inflow water passage 18, a radiator outflow water passage 19, an EGR cooler inflow water passage 20, and an EGR cooler outflow water passage 21. Hereinafter, the engine water pump 15 will be referred to as "the engine pump 15".

The engine inner water passage 11W is a water passage formed in a cylinder head (not shown) and a cylinder block (not shown) of the engine 11. The heat exchanging water flows through the engine inner water passage 11W as heat exchanging medium for exchanging heat with the cylinder head and the cylinder block. The heat exchanging water is generally liquid such as cooling water, radiator liquid, and coolant liquid.

When the heat exchanging water having a temperature lower than an engine temperature (i.e., a temperature of the engine 11), flows through the engine inner water passage 11W, the engine 11 is cooled by the heat exchanging water. On the other hand, when the heat exchanging water having a temperature higher than the engine temperature, flows through the engine inner water passage 11W, the engine 11 is heated or warmed by the heat exchanging water.

The radiator 12 includes tubes, fins and the like. The tubes define a water passage(s) 12W. The heat exchanging water flows through the water passage 12W. The fins are secured to the tubes. When the heat exchanging water having a temperature higher than a temperature of the fins of the radiator 12, flows through the water passage 12W, the heat exchanging water is cooled by the radiator 12. Hereinafter, the water passage 12W will be referred to as "the radiator inner water passage 12W".

The EGR cooler 13 includes tubes, fins and the like. The tubes define a water passage(s) 13W. The heat exchanging water flows through the water passage 13W. The fins are secured to the tubes. When the heat exchanging water having a temperature lower than a temperature of the fins of the EGR cooler 13, flows through the water passage 13W, the fins are cooled by the heat exchanging water. Hereinafter, the water passage 13W will be referred to as "the EGR cooler inner water passage 13W".

The EGR cooler 13 is a device for cooling an EGR gas. The EGR gas is an exhaust gas supplied to combustion chambers of the engine 11 by an exhaust gas recirculation system. The exhaust gas recirculation system supplies the exhaust gas by introducing the exhaust gas discharged from the combustion chambers to an exhaust passage, to an intake passage.

The engine inflow water passage 16, the engine outflow water passage 17, the radiator inflow water passage 18, the radiator outflow water passage 19, the EGR cooler inflow water passage 20, and the EGR cooler outflow water passage 21 are water passages, through which the heat exchanging water flows, and defined by pipes, respectively.

The engine pump 15 is an electric water pump driven by electric power. The engine pump 15 is provided in the engine inflow water passage 16. A downstream end of the engine inflow water passage 16 is connected to an inlet of the engine inner water passage 11W. An outlet of the engine inner water passage 11W is connected to an upstream end of the engine outflow water passage 17.

A downstream end of the engine outflow water passage 17 is connected to an upstream end of the radiator inflow water passage 18 and an upstream end of the EGR cooler inflow water passage 20 at a connection portion P1. A downstream end of the radiator inflow water passage 18 is connected to an inlet of the radiator inner water passage 12W. An outlet of the radiator inner water passage 12W is connected to an upstream end of the radiator outflow water passage 19. A downstream end of the EGR cooler inflow water passage 20 is connected to an inlet of the EGR cooler inner water passage 13W, An outlet of the EGR cooler inner water passage 13W is connected to an upstream end of the EGR cooler outflow water passage 21. A downstream end of the radiator outflow water passage 19 and a downstream end of the EGR cooler outflow water passage 21 are connected to an upstream end of the engine inflow water passage 16 at a connection portion P2.

An engine water passage of the cooling system 10 is defined by the engine inner water passage 11W, the engine outflow water passage 17, the radiator inflow water passage 18, the radiator inner water passage 12W, the radiator outflow water passage 19, the EGR cooler inflow water passage 20, the EGR cooler inner water passage 13W, the EGR cooler outflow water passage 21, and the engine inflow water passage 16.

In this regard, the engine water passage of the cooling system 10 may be defined by the engine inner water passage 11W, the engine outflow water passage 17, the radiator inflow water passage 18, the radiator inner water passage 12W, the radiator outflow water passage 19, and the engine inflow water passage 16. Alternatively, the engine water passage of the cooling system 10 may be defined by the engine inner water passage 11W, the engine outflow water passage 17, the EGR cooler inflow water passage 20, the EGR cooler inner water passage 13W, the EGR cooler outflow water passage 21, and the engine inflow water passage 16.

The radiator flow rate control valve 14r is provided in the radiator outflow water passage 19. The radiator flow rate control valve 14r is a valve for controlling a flow rate of the heat exchanging water flowing through the radiator outflow water passage 19. As an opening degree of the radiator flow rate control valve 14r increases, the flow rate of the heat exchanging water passing through the radiator flow rate control valve 14r increases. Hereinafter, the radiator flow rate control valve 14r will be referred to as "the first control valve 14r".

The EGR cooler flow rate control valve 14e is provided in the EGR cooler outflow water passage 21. The EGR cooler flow rate control valve 14e is a valve for controlling the flow rate of the heat exchanging water flowing through the EGR cooler outflow water passage 21. an opening degree of the EGR cooler flow rate control valve 14e increases, the flow rate of the heat exchanging water passing through the EGR cooler flow rate control valve 14e increases. Hereinafter, the EGR cooler flow rate control valve 14e will be referred to as "the second control valve 14e". It should be noted that the cooling system 10 may not include the second control valve 14e.

The heating system 30 includes a heater core 31, a heater water pump 32, a heat pump 33, an exhaust heat recovery device 34, a blower 35, a heat pump inflow water passage 40, a heater core inflow water passage 41, a heater core outflow water passage 42, a first exhaust heat recovery device water passage 43, a second exhaust heat recovery device water passage 44, a heater switch 78, and a temperature setting switch 79.

Hereinafter, the heater water pump 32 will be referred as "the heater pump 32", the first exhaust heat recovery device water passage 43 will be referred to as "the first EHR water passage 43", and the second exhaust heat recovery device water passage 44 will be referred to as "the second EHR water passage 44".

The heat pump inflow water passage 40, the core inflow water passage 41, the core outflow water passage 42, the first EHR water passage 43, and the second EHR water passage 44 are water passages, through which the heat exchanging water flows, and defined by pipes, respectively.

The heater core 31 includes tubes, fins and the like. The tubes define a water passage(s) 31W. The heat exchanging water flows through the water passage 31W. The fins are secured to the tubes. When the heat exchanging water having a temperature higher than a temperature of the fins of the heater core 31, flows through the water passage 31W, the fins are heated by the heat exchanging water. Therefore, the heater core 31 is heated by the heat exchanging water flowing through the water passage 31W. Hereinafter, the water passage 31W will be referred to as "the core inner water passage 31W".

Figure 2:
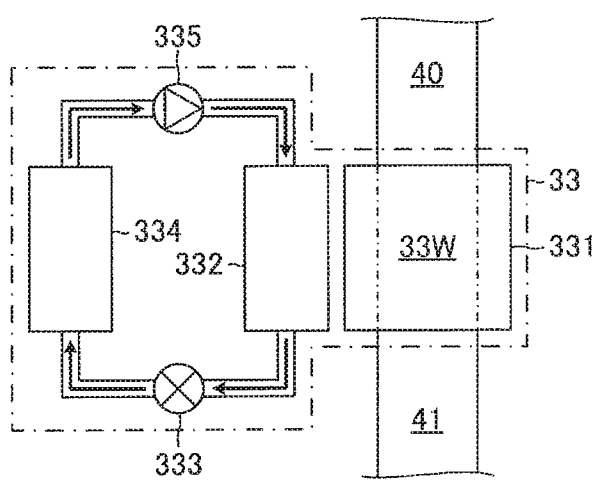
FIG. 2 is a view for showing a heat pump shown in FIG. 1.

As shown in FIG. 2, the heat pump 33 includes a heat exchanger 331, a condenser 332, an expansion valve 333, an evaporator 334, a compressor 335 and the like. The heat exchanger 331 includes a water passage(s) 33W, through which the heat exchanging water flows. Hereinafter, the water passage 33W will be referred to as "the heat pump inner water passage 33W".

When the compressor 335 is activated, heat exchanging medium is discharged from the compressor 335. The discharged heat exchanging medium flows through the compressor 335, the condenser 332, the expansion valve 333, and the evaporator 334 and then, is suctioned into the compressor 335. When the heat exchanging medium passes through the evaporator 334, the heat exchanging medium removes heat from outside of the evaporator 334, thereby evaporates. When the heat exchanging medium passes through the condenser 332, the heat exchanging medium discharges the heat, thereby condenses. A temperature of the heat exchanger 331 is increased by the heat discharged from the heat exchanging medium. Further, a temperature of the heat exchanging water flowing through the heat pump inner water passage 33W, is increased by the heat of the heat exchanger 331.

Therefore, the heat pump 33 is a heat exchanger for heating the heat exchanging water circulating through the heater water passage.

Figure 3:
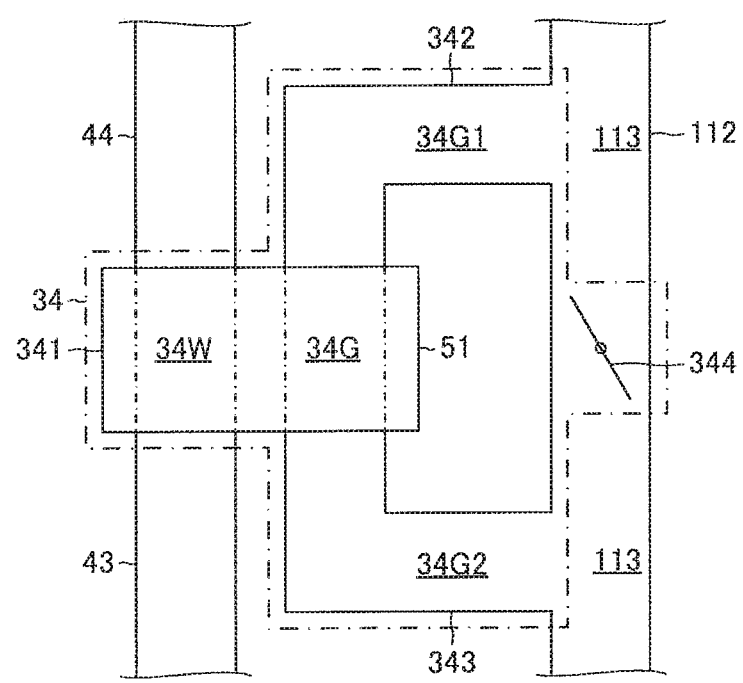
FIG. 3 is a view for showing an exhaust heat recovery device shown in FIG. 1

As shown in FIG. 3, the exhaust heat recovery device 34 includes a heat exchanger 341, an exhaust gas inflow pipe 342, an exhaust gas outflow pipe 343, an exhaust gas control valve 344, and the like.

The heat exchanger 341 includes a passage 34W and a passage 34G. The heat exchanging water flows through the passage 34W. The exhaust gas discharged from the combustion chambers of the engine 11, flows through the passage 34G. Hereinafter, the passage 34W will be referred to as "the EHR inner water passage 34W", and the passage 34G will be referred to as "the EHR exhaust gas passage 34G".

The exhaust gas control valve 344 is provided in an exhaust passage 113 defined by an exhaust pipe 112. The exhaust pipe 112 is secured to the engine 11 such that the exhaust passage 113 communicates with exhaust ports (not shown) of the engine 11.

An exhaust gas inflow pipe 342 defines an exhaust gas inflow passage 34G1. An upstream end of the exhaust gas inflow pipe 342 is connected to the exhaust pipe 112 at a position upstream of the exhaust gas control valve 344 such that the exhaust gas inflow passage 34G1 communicates with the exhaust passage 113. A downstream end of the exhaust gas inflow pipe 342 is secured to the heat exchanger 341 such that the exhaust gas inflow passage 34G1 communicates with an inlet of the EHR exhaust gas passage 34G.

The exhaust gas outflow pipe 343 defines an exhaust gas outflow passage 34G2. An upstream end of the exhaust gas outflow pipe 343 is secured to the heat exchanger 341 such that the exhaust gas outflow passage 34G2 communicates with an outlet of the EHR exhaust gas passage 34G. A downstream end of the exhaust gas outflow pipe 343 is connected to the exhaust pipe 112 at a position downstream of the exhaust gas control valve 344 such that the exhaust gas outflow passage 34G2 communicates with the exhaust passage 113.

When the exhaust gas control valve 344 is open, the exhaust gas passes through the exhaust gas control valve 344. In this case, almost of the exhaust gas passes through the exhaust gas control valve 344 and then, flows into the exhaust passage 113 downstream of the exhaust gas control valve 344. Therefore, almost no exhaust gas flows into the exhaust gas inflow passage 34G1.

On the other hand, when the exhaust gas control valve 344 is closed, the exhaust gas does not pass through the exhaust gas control valve 344. In this case, almost of the exhaust gas flows into the exhaust gas inflow passage 34G1. The exhaust gas flowing into the exhaust gas inflow passage 34G1, flows through the EHR exhaust gas passage 34G and the exhaust gas outflow passage 34G2 and then, flows into the exhaust passage 113 downstream of the exhaust gas control valve 344.

When the exhaust gas passes through the EHR exhaust gas passage 34G, the heat exchanger 341 is heated by the heat of the exhaust gas. The heat exchanging water flowing through the EHR inner water passage 34W, is heated by the heat of the heat exchanger 341.

Therefore, the exhaust heat recovery device 34 is a heat exchanger for heating the heat exchanging water circulating through the heater water passage.

The heater pump 32 is an electric water pump driven by the electric power and is provided in the core outflow water passage 42. A downstream end of the core outflow water passage 42 is connected to an end of the first EHR water passage 43 at a connection portion P3. The other end of the first EHR water passage 43 is connected to an end of the EHR inner water passage 34W. The other end of the EHR inner water passage 34W is connected to an end of the second EHR water passage 44. The other end of the second EHR water passage 44 is connected to an upstream end of the heat pump inflow water passage 40 at a connection portion P4. A downstream end of the heat pump inflow water passage 40 is connected to an inlet of the heat pump inner water passage 33W. An outlet of the heat pump inner water passage 33W is connected to an upstream end of the core inflow water passage 41. A downstream end of the core inflow water passage 41 is connected to an inlet of the core inner water passage 31W. An outlet of the core inner water passage 31W is connected to an upstream end of the core outflow water passage 42.

The heater water passage of the heating system 30 is defined by the core inner water passage 31W, the core outflow water passage 42, the first EHR water passage 43, the ERR inner water passage 34W, the second EHR water passage 44, the heat pump inflow water passage 40, the heat pump inner water passage 33W, and the core inflow water passage 41.

The connection system 60 includes a connection valve 61, a connection inflow water passage 62 and a connection outflow water passage 63. The connection inflow water passage 62 connects a portion P5 of the engine outflow water passage 17 to the connection portion P4, at which the second EHR water passage 44 and the heat pump inflow water passage 40 are connected to each other. The connection outflow water passage 63 connects a portion P6 of the engine inflow water passage 16 to the connection portion P3, at which the core outflow water passage 42 and the first EHR water passage 43 are connected to each other.

The connection valve 61 is provided in the connection inflow water passage 62. When the connection valve 61 is open, the heat exchanging water may pass through the connection valve 61. On the other hand, when the connection valve 61 is closed, the heat exchanging water may not pass through the connection valve 61.

The first embodiment apparatus includes an ECU 90. The ECU 90 is an electronic control unit. In particular, the ECU 90 is an electronic control circuit including as a main component a microcomputer including a CPU, a ROM, a RAM, an interface and the like. The CPU realizes various functions described later by executing instructions or routines stored in a memory such as the ROM.

The ECU 90 is electrically connected to the engine pump 15, the second control valve 14e, a water temperature sensor 70, an ignition switch 72, an acceleration pedal operation amount sensor 73, and a crank angle sensor 74. Activations of the engine pump 15 and the second control valve 14e are controlled by the ECU 90 as described later.

The water temperature sensor 70 is provided in the engine outflow water passage 17 upstream of the connection portion P5, at which the engine outflow water passage 17 and the connection inflow water passage 62 are connected to each other. The water temperature sensor 70 detects a temperature TWeng of the heat exchanging water flowing through the engine outflow water passage 17 upstream of the connection portion P5 and sends a signal representing the temperature TWeng to the ECU 90. The ECU 90 acquires the temperature TWeng on the basis of the signal. Hereinafter, the temperature TWeng will be referred to as "the engine water temperature TWeng".

The ignition switch 72 is operated by a driver of a vehicle, on which the engine 11 is mounted. When the ignition switch 72 is set to an ON position, the ignition switch 72 sends a high signal to the ECU 90. On the other hand, when the ignition switch 72 is set to an OFF position, the ignition switch 72 sends a low signal to the ECU 90. When the ECU 90 receives the high signal, the ECU 90 causes an engine operation (i.e., an operation of the engine 11) to start. On the other hand, when the ECU 90 receives the low signal, the ECU 90 causes the engine operation to stop.

The acceleration pedal operation amount sensor 73 detects an operation amount AP of an acceleration pedal (not shown) and sends a signal representing the operation amount AP to the ECU 90. The ECU 90 acquires an engine load KL (i.e., a load of the engine 11) on the basis of the signal.

The crank angle sensor 74 sends a pulse signal to the ECU 90 every a crank shaft (not shown) rotates by a predetermined angle. The ECU 90 acquires an engine speed NE (i.e., a rotation speed of the engine 11) on the basis of the pulse signal.

Further, the ECU 90 is electrically connected to the heater pump 32, the compressor 335 of the heat pump 33, the exhaust gas control valve 344 of the exhaust heat recovery device 34, the blower 35, the connection valve 61, a water temperature sensor 75, a water temperature sensor 76, the heater switch 78, and the temperature setting switch 79. Activations of the heater pump 32, the compressor 335 of the heat pump 33, the exhaust gas control valve 344 of the exhaust heat recovery device 34, the blower 35, and the connection valve 61 are controlled by the ECU 90 as described later.

The blower 35 is a device for blowing air toward the heater core 31, thereby heating the air by the heat of the heater core 31. The air heated by the heat of the heater core 31, is supplied to an interior of the vehicle.

The water temperature sensor 75 is provided in the second EHR water passage 44. The water temperature sensor 75 detects a temperature TWehr of the heat exchanging water flowing through the second EHR water passage 44 from the exhaust heat recovery device 34 and sends a signal representing the temperature TWehr to the ECU 90. The ECU 90 acquires the temperature TWehr on the basis of the signal. Hereinafter, the temperature TWehr will be referred to as "the EHR water temperature TWehr".

The water temperature sensor 76 is provided in the core inflow water passage 41. The water temperature sensor 76 detects a temperature TWhc of the heat exchanging water flowing into the heater core 31 from the heat pump 33 and sends a signal representing the temperature TWhc to the ECU 90. The ECU 90 acquires the temperature TWhc on the basis of the signal. Hereinafter, the temperature TWhc will be referred to as "the core water temperature TWhc".

The heater switch 78 is operated by the driver of the vehicle, on which the engine 11 is mounted. When the heater switch 78 is set to an ON position, the heater switch 78 sends a high signal to the ECU 90. On the other hand, when the heater switch 78 is set to an OFF position, the heater switch 78 sends a low signal to the ECU 90. When the ECU 90 receives the high signal, the ECU 90 determines that the heater switch 78 is set to the ON position. On the other hand, when the ECU 90 receives the low signal, the ECU 90 determines that the heater switch 78 is set to the OFF position.

The temperature setting switch 79 is a switch operated by the driver for setting a temperature of the interior of the vehicle which the driver desires. The temperature setting switch 79 sends a signal representing a temperature Tset of the interior of the vehicle set by the driver, to the ECU 90. The ECU 90 acquires the temperature Tset on the basis of the signal. Hereinafter, the temperature Tset will be referred to as "the vehicle interior set temperature Tset".

Further, the ECU 90 acquires a target of the core water temperature TWhc necessary for accomplishing the vehicle interior set temperature Tset. The ECU 90 sets the target of the core water temperature TWhc as a target core water temperature TWhc_tgt. The target core water temperature TWhc_tgt increases as the vehicle interior set temperature Tset increases. Further, the ECU 90 acquires a difference $\Delta$TWhc of the core water temperature TWhc relative to the target core water temperature TWhc_tgt ($\Delta$TWhc= TWhc_tgt−TWhc). Hereinafter, the difference $\Delta$TWhc will be referred to as "the core water temperature difference $\Delta$TWhc".

Figure 4:
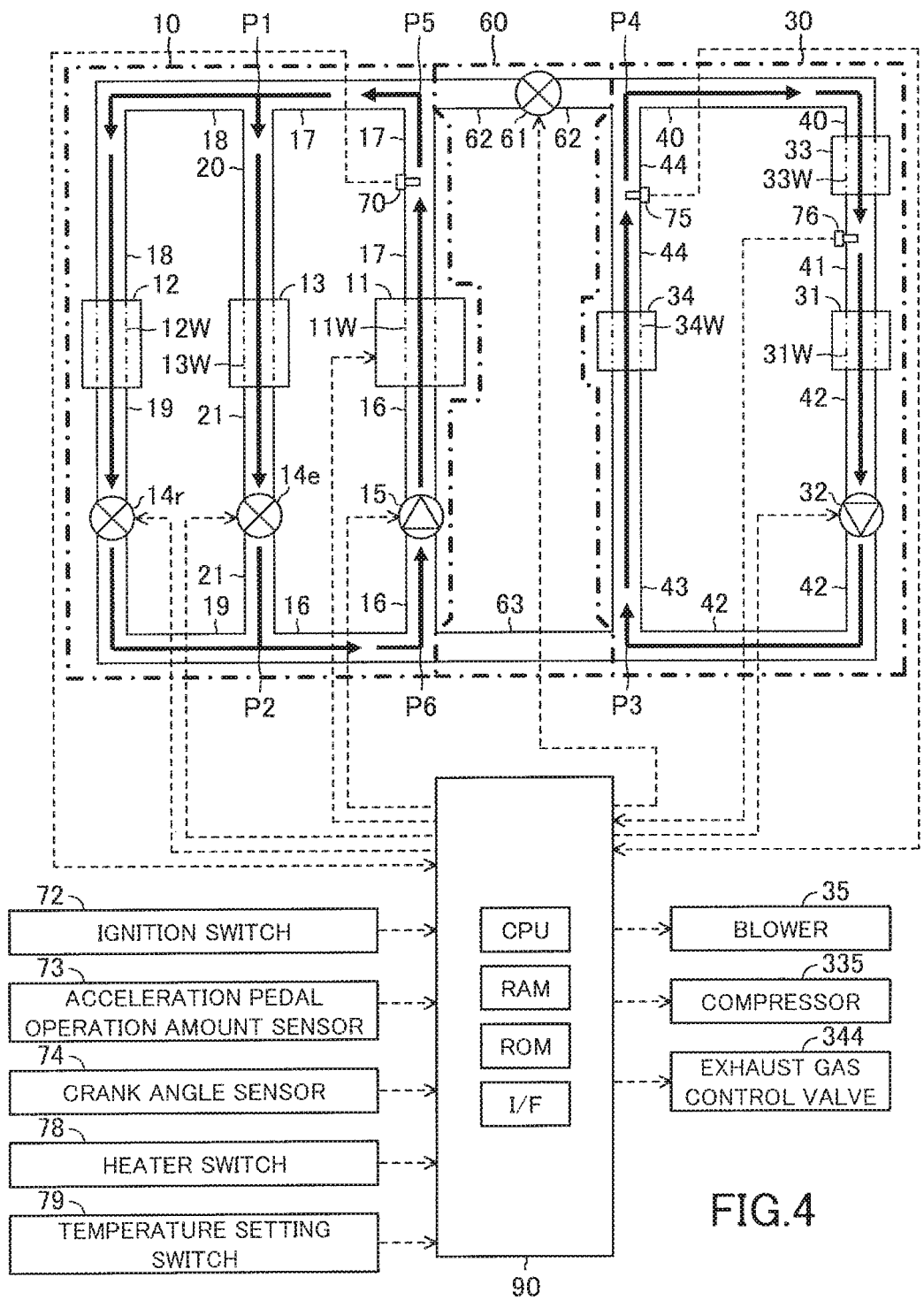
FIG. 4 is a view similar to FIG. 1 and which shows a flow of heat exchanging water.

When the connection valve 61 is closed (that is, the system connection operation is not performed), the first control valve 14r is open, and the second control valve 14e is open while the engine pump 15 and the heater pump 32 are activated, the heat exchanging water flows as shown in FIG. 4.

In particular, the heat exchanging water discharged from the engine pump 15, flows through the engine inflow water passage 16 and the engine inner water passage 11W and then, flows into the engine outflow water passage 17. A part of the heat exchanging water flowing into the engine outflow water passage 17, flows through the radiator inflow water passage 18, the radiator inner water passage 12W, the radiator outflow water passage 19, and the engine inflow water passage 16 and then, is suctioned into the engine pump 15.

On the other hand, the remaining of the heat exchanging water flowing into the engine outflow water passage 17, flows through the EGR cooler inflow water passage 20, the EGR cooler inner water passage 13W, the EGR cooler outflow water passage 21, and the engine inflow water passage 16 and then, is suctioned into the engine pump 15.

The heat exchanging water discharged from the heater pump 32, flows through the core outflow water passage 42, the first EHR water passage 43, the EHR inner water passage 34W, the second El-IR water passage 44, the heat pump inflow water passage 40, the heat pump inner water passage 33W, the core inflow water passage 41, the core inner water passage 31W, and the core outflow water passage 42 and then, is suctioned into the heater pump 32.

Figure 5:
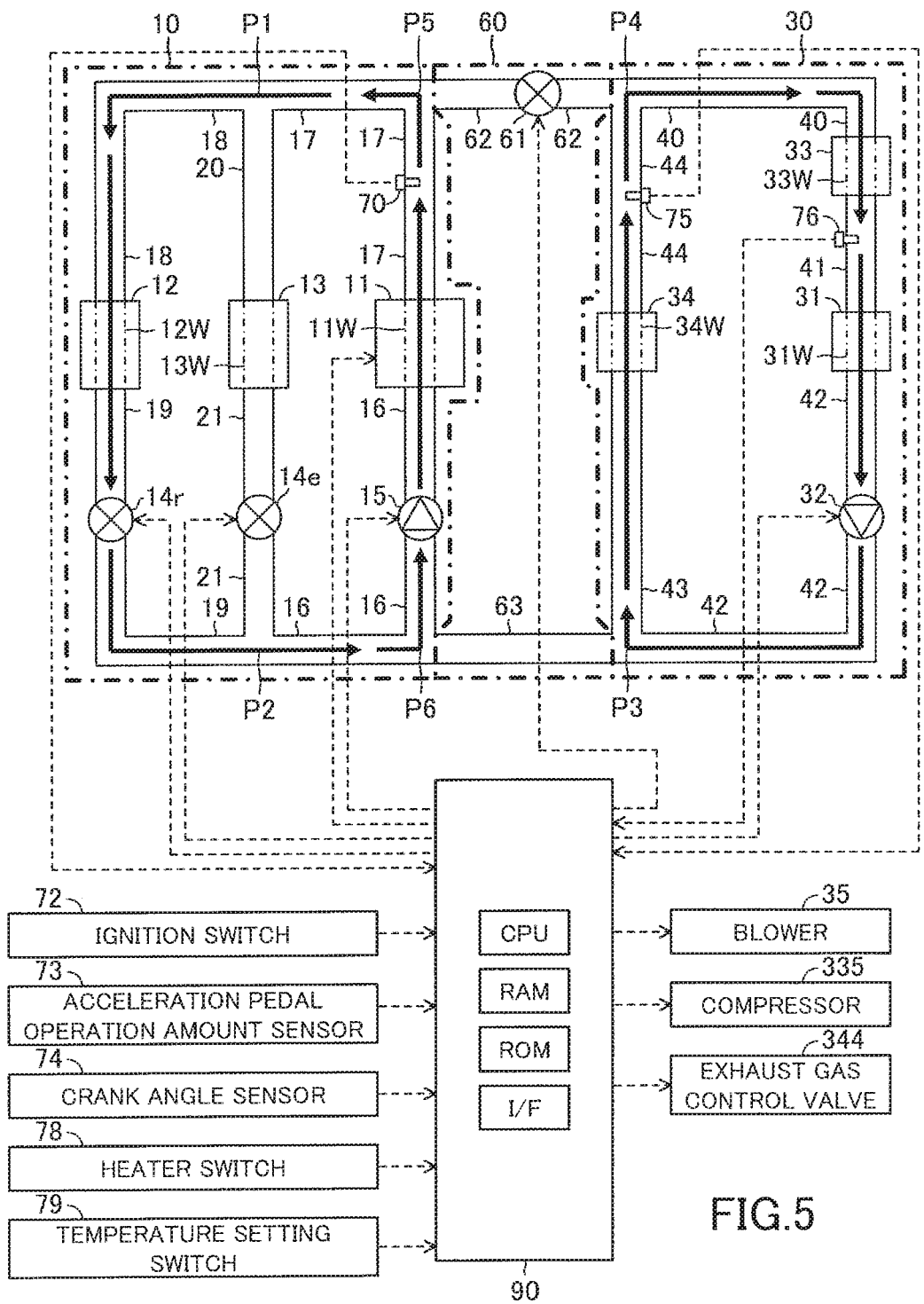
FIG. 5 is a view similar to FIG. 1 and which shows the flow of the heat exchanging water.

When the connection valve 61 is closed (that is, the system connection operation is not performed), the first control valve 14r is open, and the second control valve 14e is closed while the engine pump 15 and the heater pump 32 are activated, the heat exchanging water flows as shown in FIG. 5.

In this case, the flow of the heat exchanging water in the cooling system 10 and the heating system 30 is the same as the flow of the heat exchanging water described with reference to FIG. 4, except that the heat exchanging water discharged from the engine pump 15, does not flow through the EGR cooler inflow water passage 20, the EGR cooler inner water passage 13W, and the EGR cooler outflow water passage 21.

Figure 6:
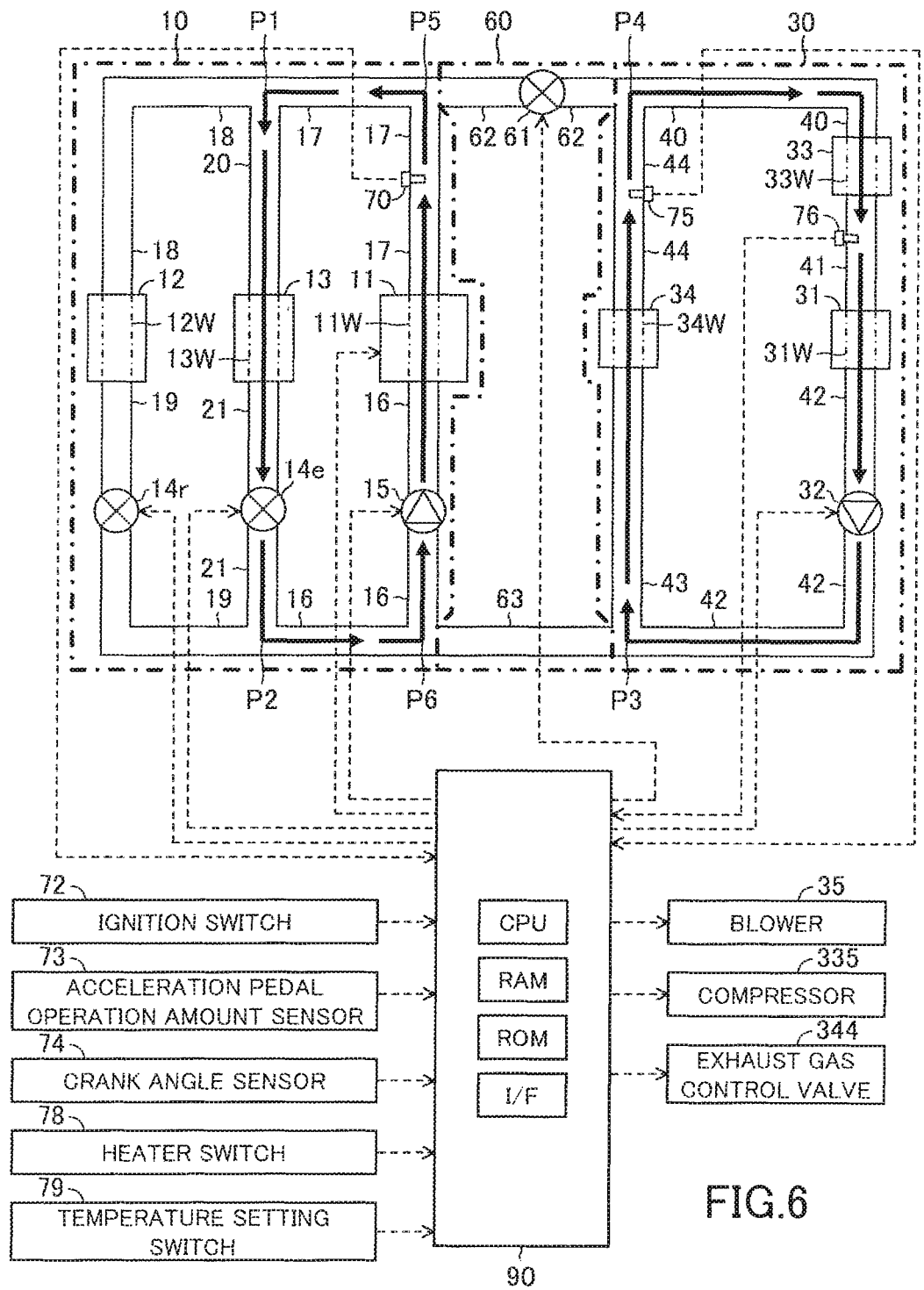
FIG. 6 is a view similar to FIG. 1 and which shows the flow of the heat exchanging water.

When the connection valve 61 is closed (that is, the system connection operation is not performed), the first control valve 14r is closed, and the second control valve 14e is open while the engine pump 15 and the heater pump 32 are activated, the heat exchanging water flows as shown in FIG. 6.

In this case, the flow of the heat exchanging water in the cooling system 10 and the heating system 30 is the same as the flow of the heat exchanging water described with reference to FIG. 4, except that the heat exchanging water discharged from the engine pump 15, does not flow through the radiator inflow water passage 18, the radiator inner water passage 12W, and the radiator outflow water passage 19.

The flow of the heat exchanging water described with reference to FIG. 4, FIG. 5, and FIG. 6 is the flow of the heat exchanging water when the engine pump 15 and the heater pump 32 are activated. However, in this embodiment, only one of the engine pump 15 and the heater pump 32 may be activated.

When the heater pump 32 is not activated, and the engine pump 15 is activated, the heat exchanging water does not circulate through the heater water passage, and the heat exchanging water circulates through the engine water passage. On the other hand, when the engine pump 15 is not activated, and the heater pump 32 is activated, the heat exchanging water does not circulate through the engine water passage, and the heat exchanging water circulates through the heater water passage.

Figure 7:
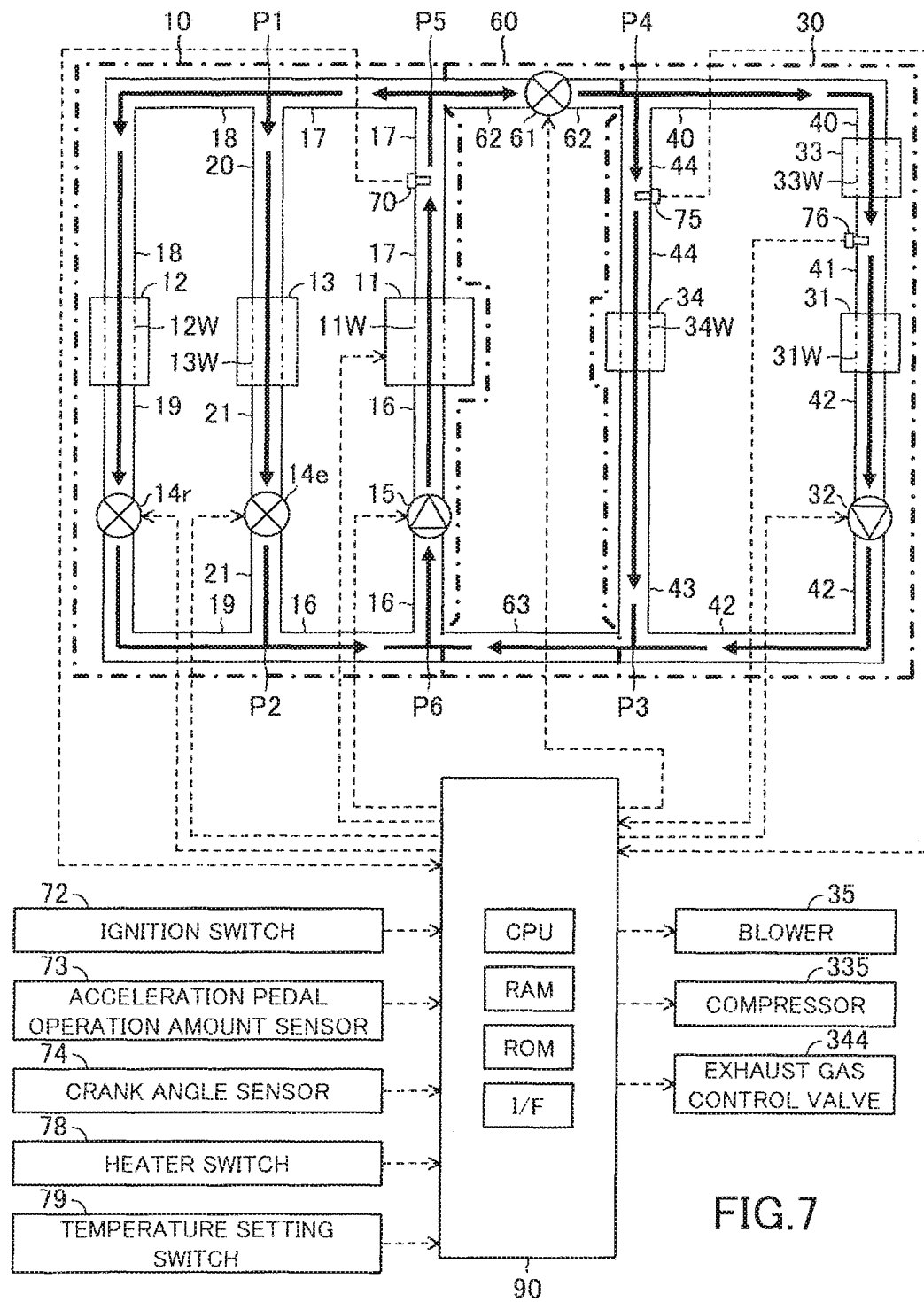
FIG. 7 is a view similar to FIG. 1 and which shows the flow of the heat exchanging water.

When the connection valve 61 is open (that is, the system connection operation is performed), the first control valve 14r is open, and the second control valve 14e is open while the engine pump 15 and the heater pump 32 are activated, the heat exchanging water flows as shown in FIG. 7.

In particular, the heat exchanging water discharged from the engine pump 15, flows into the engine inner water passage 11W. A part of the heat exchanging water flowing into the engine outflow water passage 17 through the engine inner water passage 11W, flows through the engine outflow water passage 17 and then, flows into the radiator inflow water passage 18 and the EGR cooler inflow water passage 20. The heat exchanging water flowing into the radiator inflow water passage 18, flows through the radiator inner water passage 12W and the radiator outflow water passage 19, and then, flows into the engine inflow water passage 16. The heat exchanging water flowing into the engine inflow water passage 16, is suctioned into the engine pump 15. The heat exchanging water flowing into the EGR cooler inflow water passage 20, flows through the EGR cooler inner water passage 13W, the EGR cooler outflow water passage 21, and the engine inflow water passage 16 and then, is suctioned into the engine pump 15.

On the other hand, the remaining of the heat exchanging water flowing into the engine outflow water passage 17 through the engine inner water passage 11W, flows through the connection inflow water passage 62 and then, flows into the heat pump inflow water passage 40 and the second EHR water passage 44. The heat exchanging water flowing into the heat pump inflow water passage 40, flows through the heat pump inner water passage 33W, the core inflow water passage 41, and the core inner water passage 31W and then, is suctioned into the heater pump 32. The heat exchanging water flowing into the second EHR water passage 44, flows through the EHR inner water passage 34W, the connection outflow water passage 63, and the engine inflow water passage 16 and then, is suctioned into the engine pump 15.

Further, the heat exchanging water discharged from the heater pump 32, flows through the core outflow water passage 42, the connection outflow water passage 63, and the engine inflow water passage 16 and then, is suctioned into the engine pump 15.

Figure 8:
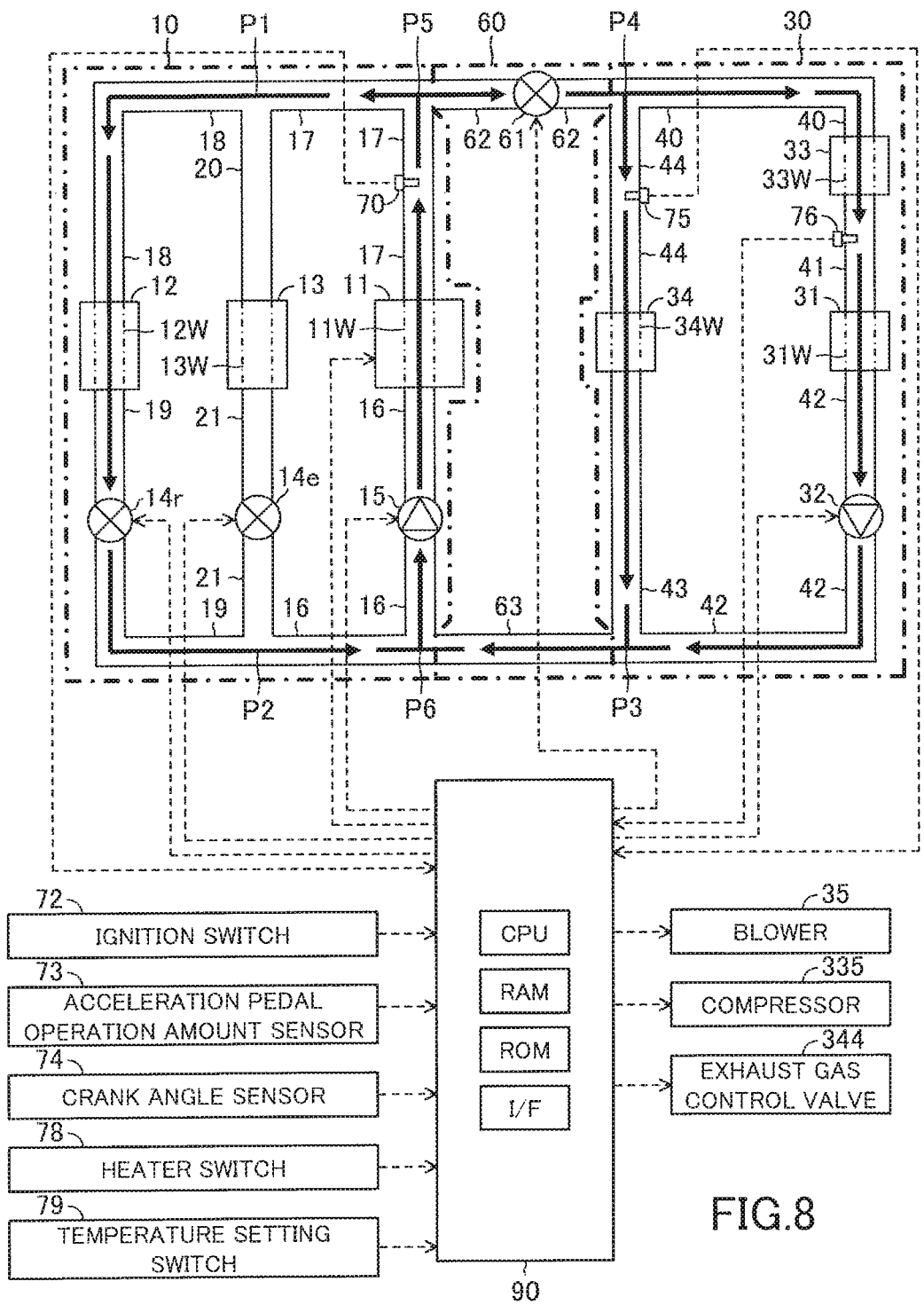
FIG. 8 is a view similar to FIG. 1 and which shows the flow of the heat exchanging water.

When the connection valve 61 is open (that is, the system connection operation is performed), the first control valve 14r is open, and the second control valve 14e is closed while the engine pump 15 and the heater pump 32 are activated, the heat exchanging water flows as shown in FIG. 8.

In this case, the flow of the heat exchanging water in the cooling system 10 and the heating system 30 is the same as the flow of the heat exchanging water described with reference to FIG. 7, except that the heat exchanging water discharged from the engine pump 15, does not flow through the EGR cooler inflow water passage 20, the EGR cooler inner water passage 13W, and the EGR cooler outflow water passage 21.

Figure 9:
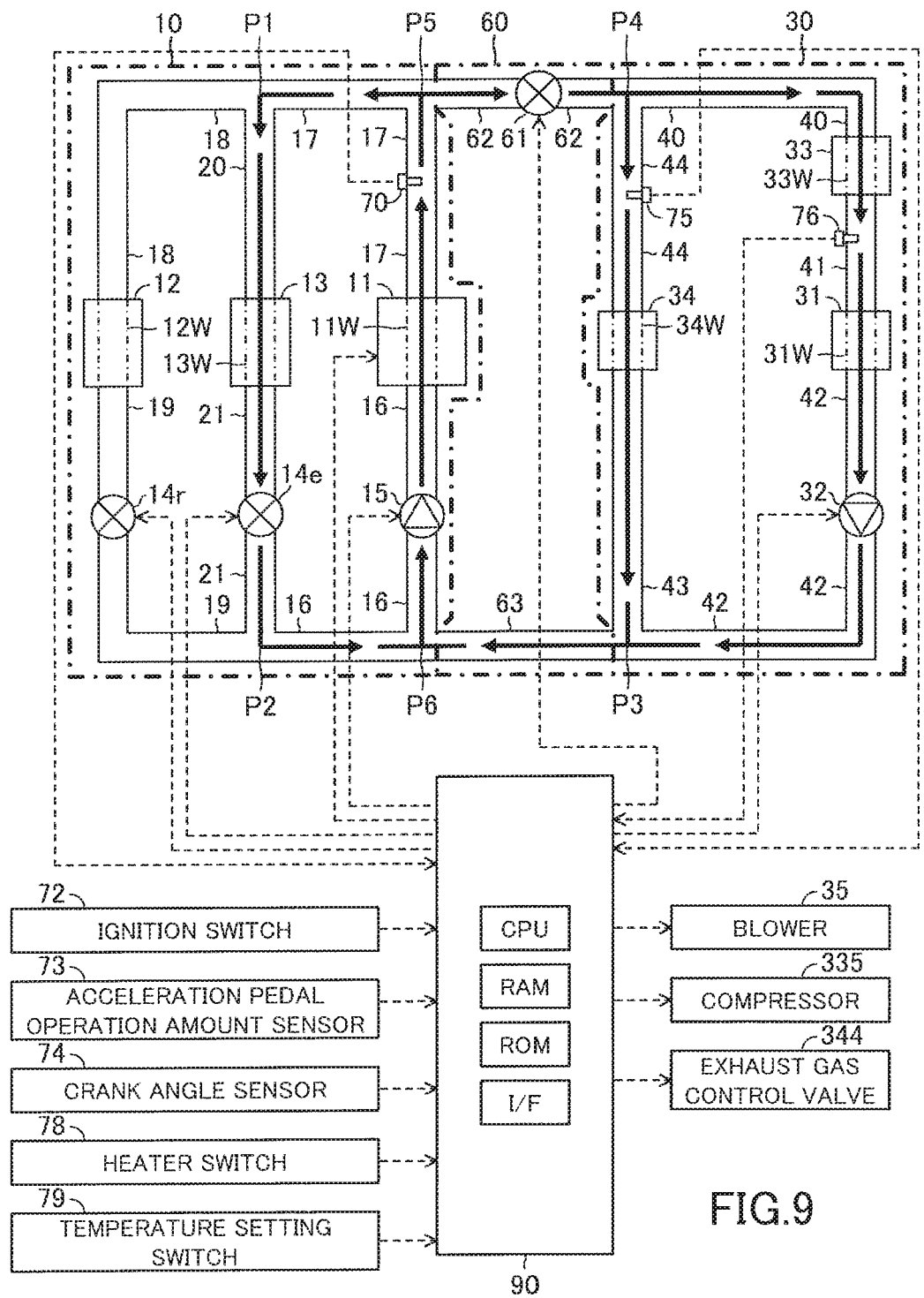
FIG. 9 is a view similar to FIG. 1 and which shows the flow of the heat exchanging water.

When the connection valve 61 is open (that is, the system connection operation is performed), the first control valve 14r is closed, and the second control valve 14e is open while the engine pump 15 and the heater pump 32 are activated, the heat exchanging water flows as shown in FIG. 9.

In this case, the flow of the heat exchanging water in the cooling system 10 and the heating system 30 is the same as the flow of the heat exchanging water with reference to FIG. 7, except that the heat exchanging water discharged from the engine pump 15 does not flow through the radiator inflow water passage 18, the radiator inner water passage 12W, and the radiator outflow water passage 19.

Figure 10:
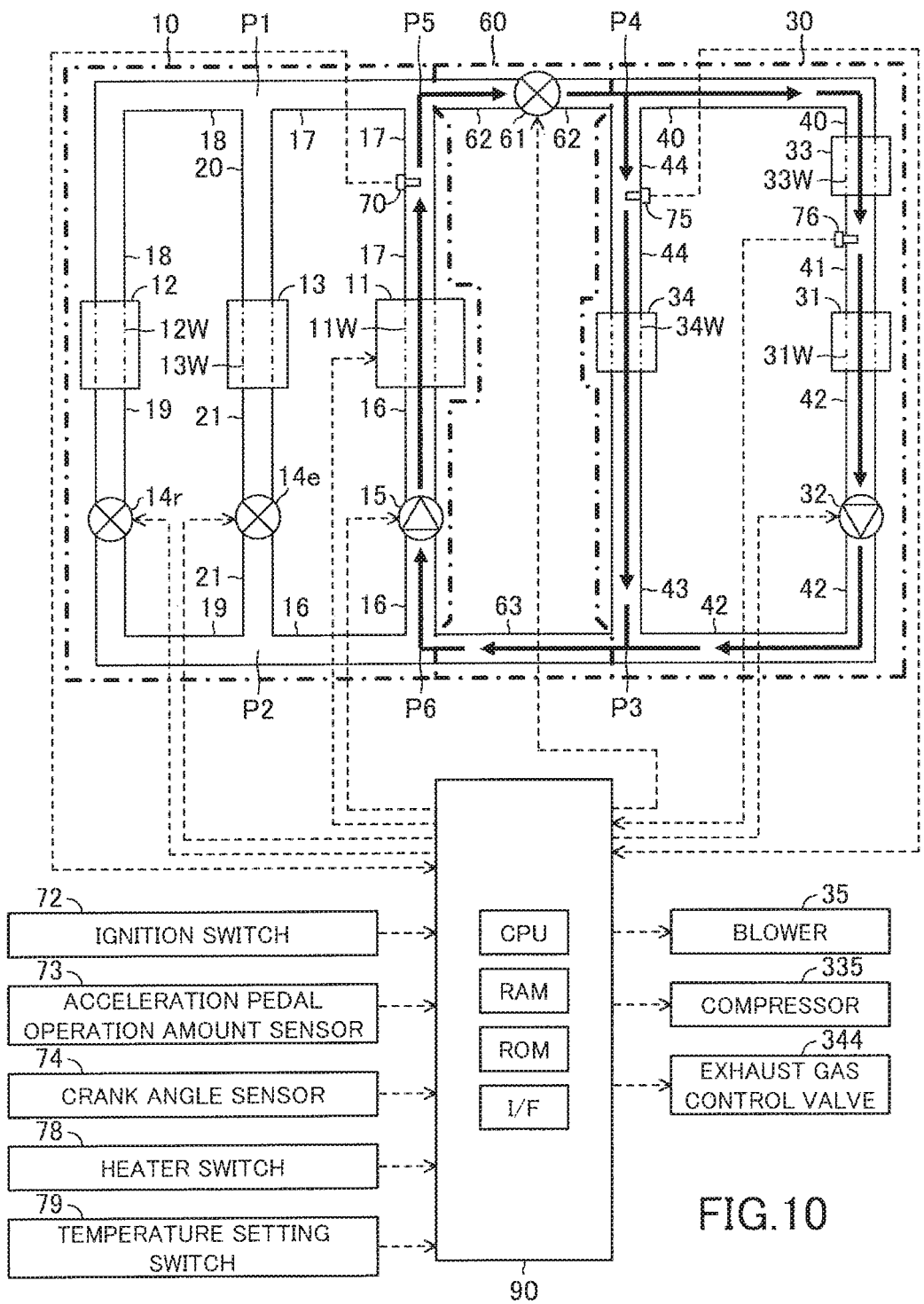
FIG. 10 is a view similar to FIG. 1 and which shows the flow of the heat exchanging water.

When the first control valve 14r and the second control valve 14e are closed while the heat exchanging water flows as shown in FIG. 7, the heat exchanging water flows as shown in FIG. 10. In this case, the flow of the heat exchanging water in the cooling system 10 and the heating system 30 is the same as the flow of the heat exchanging water described with reference to FIG. 7, except that the heat exchanging water discharged from the engine pump 15 does not flow through the EGR cooler inflow water passage 20, the EGR cooler inner water passage 13W, the EGR cooler outflow water passage 21, the radiator inflow water passage 18, the radiator inner water passage 12W, and the radiator outflow water passage 19.

Also, when the first control valve 14r is closed while the heat exchanging water flows as shown in FIG. 8, the heat exchanging water flows as shown in FIG. 10. When the second control valve 14e is closed while the heat exchanging water flows as shown in FIG. 9, the heat exchanging water flows as shown in FIG. 10.

<Summary of Operation of First Embodiment Apparatus>

Next, a summary of an operation of the first embodiment apparatus will be described. The first embodiment apparatus cools the engine 11 by activating the engine pump 15 to supply the heat exchanging water to the engine inner water passage 11W when an engine circulation condition that a circulation of the heat exchanging water in the engine water passage is requested, is satisfied.

In this embodiment, the engine circulation condition is satisfied when a temperature TWeng1 of the heat exchanging water in the engine inner water passage 11W is equal to or higher than a predetermined water temperature TWeng1_th while the activation of the engine pump 15 is stopped after the ignition switch 72 is set to the ON position and the engine operation starts. Hereinafter, the temperature TWeng1 will be referred to as "the engine inner water temperature TWeng1".

When the engine inner water temperature TWeng1 increases excessively, the heat exchanging water may boil in the engine inner water passage 11W. In this regard, the first embodiment apparatus is configured such that the engine circulation condition is satisfied in response to the engine inner water temperature TWeng1 becoming equal to or higher than the predetermined water temperature TWeng1_th. Therefore, the engine pump 15 is activated, thereby decreasing the temperature of the heat exchanging water in the engine inner water passage 11W when the engine inner water temperature TWeng1 becomes equal to or higher than the predetermined water temperature TWeng1_th. Thereby, the engine inner water temperature TWeng1 may be prevented from increasing excessively. As a result, the heat exchanging water may be prevented from boiling in the engine inner water passage 11W.

The predetermined water temperature TWeng1_th is set to an upper limit of a sufficiently low temperature of the heat exchanging water capable of preventing the heat exchanging water from boiling in the engine inner water passage 11W while the activation of the engine pump 15 is stopped.

The engine inner water passage TWeng1 may be estimated on the basis of the temperature TWeng detected by the water temperature sensor 70 after the engine operation starts. Alternatively, the engine inner water temperature TWeng1 may be estimated on the basis of a combination of parameters such as the temperature TWeng detected by the water temperature sensor 70 at a time of the engine operation starting, a time elapsing from the time of the engine operation starting, a history of the engine operation after the engine operation starts (in particular, a total amount of fuel supplied to the engine 11 after the engine operation starts), and the like.

Alternatively, the temperature detected by another water temperature sensor for detecting the engine inner water temperature TWeng1 provided in the engine 11, may be used as the engine inner water temperature TWeng1.

In this regard, when between-bores water passages for the heat exchanging water are formed between adjacent cylinder bores of the engine 11, another water temperature sensor is preferably provided for detecting a temperature of the heat exchanging water in the between-bores water passage. The between-bores water passages are so-called drilled paths and are formed to branch from a cylinder head water passage formed in a cylinder head of the engine 11 to between the adjacent cylinder bores.

Alternatively, a water temperature sensor for detecting a temperature of the heat exchanging water in a water passage for cooling an exhaust manifold of the engine 11, is preferably provided in the engine 11.

Further, in this embodiment, the engine circulation condition is satisfied when a temperature difference ΔTeng between temperatures of optional two portions of the engine 11 is equal to or larger than a predetermined temperature difference ΔTeng_th while the activation of the engine pump 15 is stopped after the engine operation starts. Hereinafter, temperature difference ΔTeng between temperatures of optional two portions of the engine 11, will be referred to as "the engine inner temperature difference ΔTeng".

When an excessively large temperature difference is produced in the engine 11, a strain may be produced in the engine 11. In this regard, the first embodiment apparatus is configured such that the engine circulation condition is satisfied in response to the engine inner temperature difference ΔTWeng becoming equal to or larger than the predetermined temperature difference ΔTWeng_th. Therefore, the engine pump 15 is activated, thereby decreasing the engine inner temperature difference ΔTWeng when the engine inner temperature difference ΔTWeng becomes equal to or larger than the predetermined temperature difference ΔTWeng_th. Thereby, the excessively large temperature difference may be prevented from being generated in the engine 11. As a result, the strain may be prevented from be generated in the engine 11.

The predetermined temperature difference ΔTWeng_th is set to an upper limit of a sufficiently small temperature difference capable of maintaining the strain produced in the engine 11 in a permitted range while the activation of the engine pump 15 is stopped.

Further, the engine inner temperature difference ΔTeng is estimated on the basis of a combination of parameters such as the temperature TWeng detected by the water temperature sensor 70 at the time of the engine operation starting, the time elapsing from the time of the engine operation starting, the history of the engine operation after the engine operation starts (in particular, the total amount of the fuel supplied to the engine 11 after the engine operation starts), and the like.

Alternatively, a difference between the engine inner water temperatures TWeng1 detected by water temperature sensors for detecting the engine inner water temperatures TWeng1, respectively provided in at least two portions of the engine 11, may be used as the engine inner temperature difference ΔTeng.

In this regard, there are preferably provided in the engine 11, a water temperature sensor for detecting the temperature of the heat exchanging water for cooling upper areas of the cylinder bores (i.e., cylinder liners) defining the combustion chambers of the engine 11 and a water temperature sensor for detecting the temperature of the heat exchanging water for cooling lower areas of the cylinder bores (i.e., the cylinder liners).

The first embodiment apparatus may be configured to determine that the engine circulation condition is satisfied when the engine operation starts. Alternatively, the first embodiment apparatus may be configured to determine that the engine circulation condition is satisfied when the temperature of the engine 11 reaches or is estimated to reach a predetermined temperature.

Further, the first embodiment apparatus warms up the interior of the vehicle by activating the heater pump 32 to supply the heat exchanging water to the core inner water passage 31W, thereby heating the heater core 31, and activating the blower 35 when a warm-up condition that the heater switch 78 is set to the ON position, is satisfied.

When the heat exchanging water circulating through the engine water passage of the cooling system 10 is supplied to the heater water passage of the heating system 30 by performing the system connection operation, the heater core 31 is heated by the heat of the engine 11. However, when the system connection operation is performed while the engine water temperature TWeng is lower than the core water temperature TWhc, the core water temperature TWhc decreases. As a result, the temperature of the heater core 31 decreases. In this case, a temperature of the air (warm air) supplied to the interior of the vehicle, decreases. As a result, persons in the vehicle may feel discomfort.

Further, when the system connection operation is performed while a flow rate Veng of the heat exchanging water circulating through the engine water passage of the cooling system 10, is smaller than a flow rate Vht of the heat exchanging water circulating the heater water passage of the heating system 30, the flow rate Vhc of the heat exchanging water flowing through the core inner water passage 31W, decreases. As a result, the temperature of the heater core 31 may decrease. in this case, the temperature of the air (the warm air) supplied to the interior of the vehicle, decreases. As a result, the persons in the vehicle may feel discomfort. Hereinafter, the flow rate Veng of the heat exchanging water circulating through the engine water passage of the cooling system 10, will be referred to as "the engine water flow rate Veng", the flow rate Vht of the heat exchanging water circulating the heater water passage of the heating system 30, will be referred to as "the heater water flow rate Vht", and the flow rate of the heat exchanging water flowing through the core inner water passage 31W, will be referred to as "the core water flow rate Vhc".

Accordingly, the first embodiment apparatus performs the system communication operation by opening the connection valve 61 when there is satisfied a connection condition that the engine circulation condition is satisfied, the warm-up condition is satisfied, the engine water temperature TWeng is equal to or higher than the core water temperature TWhc, and the engine flow rate Veng is equal to or larger than the heater flow rate Vht. On the other hand, when the engine water temperature TWeng is smaller than the core water temperature TWhc or the engine flow rate Veng is smaller than the heater flow rate Vht while the engine circulation condition and the warm-up condition are satisfied, the first embodiment apparatus does not perform the system connection operation.

Thereby, the heat exchanging water flowing in the cooling system 10 is supplied to the heating system 30 by performing the system connection operation when the engine water temperature TWeng is equal to or higher than the core water temperature TWhc and the engine flow rate Veng is equal to and larger than the heater flow rate Vht. Thus, the temperature of the air (the warm air) supplied to the interior of the vehicle may be prevented from decreasing when the system connection operation is performed. Thereby, the persons in the vehicle are unlikely to feel discomfort.

The first embodiment apparatus acquires the engine flow rate Veng on the basis of a discharging flow rate Vengp of the heat exchanging water discharged from the engine pump 15. The first embodiment apparatus acquires the discharging flow rate Vengp of the heat exchanging water discharged from the engine pump 15 on the basis of a duty ratio DE of the engine pump 15. Further, the first embodiment apparatus acquires the heater flow rate Vht on the basis of a discharging flow rate Vhtp of the heat exchanging water discharged from the heater pump 32. The first embodiment apparatus acquires the discharging flow rate Vhtp of the heat exchanging water discharged from the heater pump 32 on the basis of a duty ratio DH of the heater pump 32.

<Concrete Operation of First Embodiment Apparatus>

Next, a concrete operation of the first embodiment apparatus will be described. The CPU of the ECU 90 of the first embodiment apparatus is configured or programmed to execute a routine shown by a flowchart in FIG. 11 for controlling the duty ratio DE of the engine pump 15, the duty ratio DH of the heater pump 32, and the activation of the connection valve 61 each time a predetermined time elapses.

Figure 11:
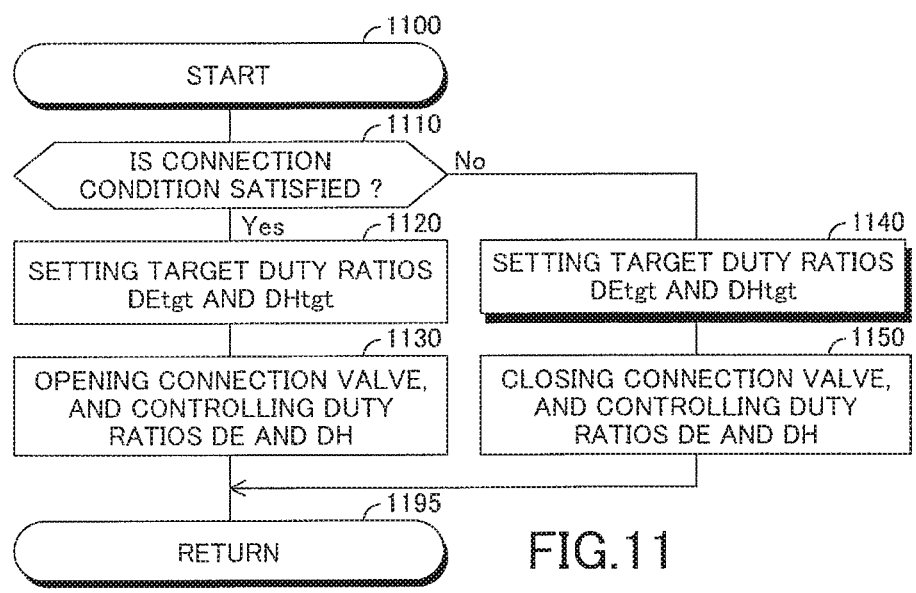
FIG. 11 is a view for showing a flowchart of a routine executed by a CPU of an ECU shown in FIG. 1.

Therefore, at a predetermined timing, the CPU starts a process from a step 1100 in FIG. 11 and then, proceeds with the process to a step 1110 to determine whether the connection condition is satisfied. When the connection condition is satisfied, the CPU determines "Yes" at the step 1110 and then, sequentially executes processes of steps 1120 and 1130 described below. Then, the CPU proceeds with the process to a step 1195 to terminate this routine once.

Step 1120: The CPU applies the engine speed NE, the engine load KL, the core water temperature TWhc, and the vehicle interior set temperature Tset to a look-up table MapDE2(NE, KL, TWhc, Tset) to acquire a duty ratio DE2, and sets the duty ratio DE2 to a target duty ratio DEtgt. In addition, the CPU applies the engine speed NE, the engine load KL, the core water temperature TWhc, and the vehicle interior set temperature Tset to a look-up table MapDH2 (NE, KL, TWhc, Tset) to acquire a duty ratio DH2, and sets the duty ratio DH2 to a target duty ratio DHtgt.

The duty ratio DE2 is a duty ratio DE for activating the engine pump 15 such that the engine flow rate Veng (i.e., the flow rate of the heat exchanging water supplied to the engine inner water passage 11W) is equal to or larger than a predetermined requested flow rate Veng_req while the system connection operation is performed. Further, the predetermined requested flow rate Veng_req is a flow rate Veng of the heat exchanging water to be supplied to the engine inner water passage 11W for accomplishing requests for the cooling system 10 to prevent the engine 11 from overheating, prevent the heat exchanging water from boiling in the cooling system 10, and the like.

The duty ratio DH2 is a duty ratio DH for activating the heater pump 32 such that the core flow rate Vhc (i.e., the flow rate of the heat exchanging water supplied to the core inner water passage 31W) is equal to or larger than a predetermined requested flow rate Vhc_req while the system connection operation is performed. Further, the predetermined requested flow rate Vhc_req is a flow rate Vhc of the heat exchanging water to be supplied to the core inner water passage 31W for maintaining the temperature of the heater core 31 equal to or higher than a predetermined temperature.

Step 1130: The CPU opens the connection valve 61, controls the duty ratio DE of the engine pump 15 to the target duty ratio DEtgt, and controls the duty ratio OH of the heater pump 32 to the target duty ratio DHtgt.

When the connection condition is not satisfied at a time of the CPU executing the process of the step 1110, the CPU determines "No" at the step 1110 and then, proceeds with the process to a step 1140. When the CPU proceeds with the process to the step 1140, the CPU executes a routine shown by a flowchart in FIG. 12.

Figure 12:
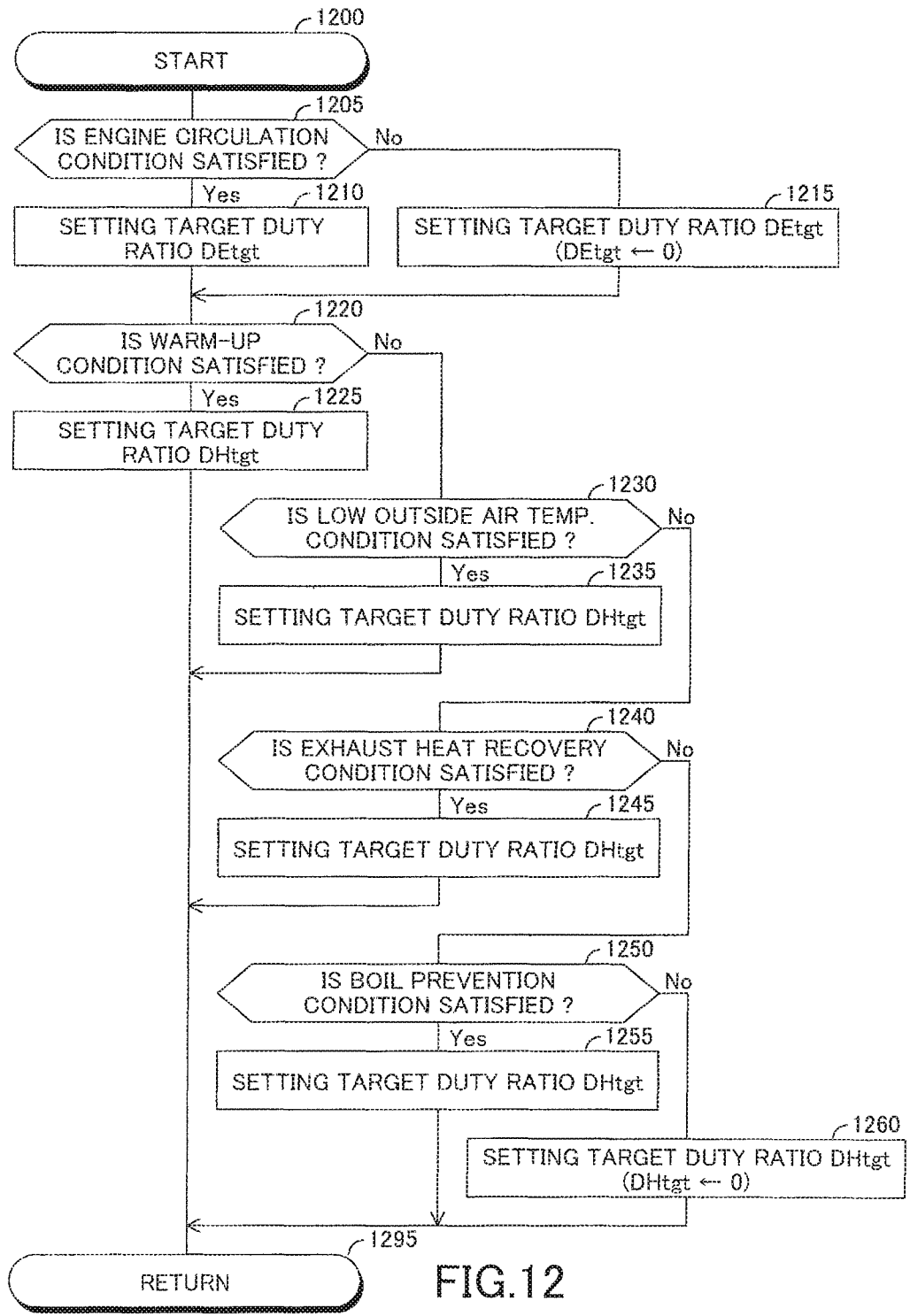
FIG. 12 is a view for showing a flowchart of a routine executed by the CPU.

Therefore, when the CPU proceeds with the process to the step 1140, the CPU start a process from a step 1200 in FIG. 12 and then, proceeds with the process to a step 1205 to determine whether the engine circulation condition is satisfied. When the engine circulation condition is satisfied, the CPU determines "Yes" at the step 1205 and then, executes a process of a step 1210 described below. Then, the CPU proceeds with the process to a step 1220.

Step 1210: The CPU applies the engine speed NE and the engine load KL to a look-up table MapDE1(NE, KL) to acquire a duty ratio DEL and sets the duty ratio DE1 to the target duty ratio DEtgt. The duty ratio DE1 is a duty ratio DE for activating the engine pump 15 such that the engine flow rate Veng is equal to or larger than the predetermined requested flow rate Veng_req while the system connection operation is not performed.

On the other hand, when the engine circulation condition is not satisfied, the CPU determines "No" at the step 1205 and then, executes a process of a step 1215 described below. Then, the CPU proceeds with the process to a step 1220.

Step 1215: The CPU sets the target duty ratio DEtgt to zero.

When the CPU proceeds with the process to the step 1220, the CPU determines whether the warm-up condition is satisfied. When the warm-up condition is satisfied, the CPU determines "Yes" at the step 1220 and then, executes a process of a step 1225 described below. Then, the CPU proceeds with the process to a step 1150 in HG. 11 via a step 1295.

Step 1225: The CPU applies the core water temperature TWhc and the vehicle interior set temperature Tset to a look-up table MapDH1(TWhc, Tset) to acquire a duty ratio DH1, and sets the duty ratio DH1 to the target duty ratio DHtgt. The duty ratio DH1 is a duty ratio DH for activating the heater pump 32 such that the core flow rate Vhc is equal to or larger than the predetermined requested flow rate Vhc_req while the system connection operation is not performed.

On the other hand, when the warm-up condition is not satisfied, the CPU determines "No" at the step 1220 and then, proceeds with the process to a step 1230 to determine whether a low outside air temperature condition is satisfied. The low outside air temperature condition is a condition that a temperature Ta of the outside air is lower than a low temperature threshold set to a relatively low temperature. In this embodiment, the low temperature threshold is 5 degrees C. When the low outside air temperature condition is satisfied, the CPU determines "Yes" at the step 1230 and then, executes a process of a step 1235 described below. Then, the CPU proceeds with the process to a step 1150 in FIG. 11 via the step 1295.

Step 1235: The CPU applies the outside air temperature Ta to a look-up table MapDH3(Ta) to acquire a duty ratio DH3, and sets the duty ratio DH3 to the target duty ratio DHtgt. The duty ratio DH3 is a predetermined duty ratio OH for circulating the heat exchanging water having an appropriate flow rate through the heater water passage of the heating system 30 while the low outside air temperature condition is satisfied, and the system connection operation is not performed.

On the other hand, when the low outside air condition is not satisfied, the CPU determines "No" at the step 1230 and then, proceeds with the process to a step 1240 to determine whether an exhaust heat recovery condition for closing the exhaust gas control valve 344 of the exhaust heat recovery device 34 is satisfied. The exhaust heat recovery condition is satisfied when three conditions 1 to 3 described below are satisfied.

(Condition 1) The engine 11 operates.

(Condition 2) An output Preq requested for the engine 11 is equal to or smaller than a predetermined value Pth.

(Condition 3) The core water temperature TWhc is lower than a predetermined water temperature TWhc_th. In this embodiment, the predetermined water temperature TWhc_th is 70 degrees C. The predetermined water temperature TWhc_th is set to a temperature capable of preventing the heat exchanging water from boiling due to the activation of the exhaust heat recovery device 34.

When the exhaust heat recovery condition is satisfied, the CPU determines "Yes" at the step 1240 and then, executes a process of a step 1245 described below. Then, the CPU proceeds with the process to the step 1150 in FIG. 11 via the step 1295.

Step 1245: The CPU applies the core water temperature TWhc to a look-up table MapDH4(TWhc) to acquire a duty ratio DH4, and sets the duty ratio DH4 to the target duty ratio DHtgt. The duty ratio DH4 is a predetermined duty ratio OH for circulating the heat exchanging water having an appropriate flow rate through the heater water passage of the heating system 30 while the exhaust heat recovery condition is satisfied, and the system connection operation is not performed.

On the other hand, when the exhaust heat recovery condition is not satisfied, the CPU determines "No" at the step 1240 and then, proceeds with the process to a step 1250 to determine whether a boiling prevention condition for activating the heater pump 32 for preventing the heat exchanging water from boiling in the EHR inner water passage 34W, is satisfied. The boiling prevention condition is satisfied when the EHR water temperature TWehr is equal to or higher than a predetermined water temperature TWehr_th. In this embodiment, the predetermined water temperature TWehr_th is 95 degrees C.

When the boiling prevention condition is satisfied, the CPU determines "Yes" at the step 1250 and then, executes a process of a step 1255 described below. Then, the CPU proceeds with the process to the step 1150 in FIG. 11 via the step 1295.

Step 1255: The CPU applies the EHR water temperature TWehr to a look-up table MapDH5(TWehr) to acquire a duty ratio DH5, and sets the duty ratio DH5 to the target duty ratio DHtgt. The duty ratio DH5 is a predetermined duty ratio DH for circulating the heat exchanging water having an appropriate flow rate through the heater water passage of the heating system 30 while the boiling prevention condition is satisfied, and the system connection operation is not performed.

On the other hand, when the boil prevention condition is not satisfied, the CPU determines "No" at the step 1250 and then, executes a process of a step 1260 described below. Then, the CPU proceeds with the process to the step 1150 in FIG. 11 via the step 1295.

Step 1260: The CPU sets the target duty ratio DHtgt to zero.

When the CPU proceeds with the process to the step 1150 in FIG. 11, the CPU doses the connection valve 61, controls the duty ratio DE to the target duty ratio DEtgt set at the step 1140 (i.e. the routine shown in FIG. 12), and controls the duty ratio DH to the target duty ratio DHtgt set at the step 1140 (i.e. the routine shown in FIG. 12). Then, the CPU proceeds with the process to the step 1195 to terminate this routine once.

Figure 13:
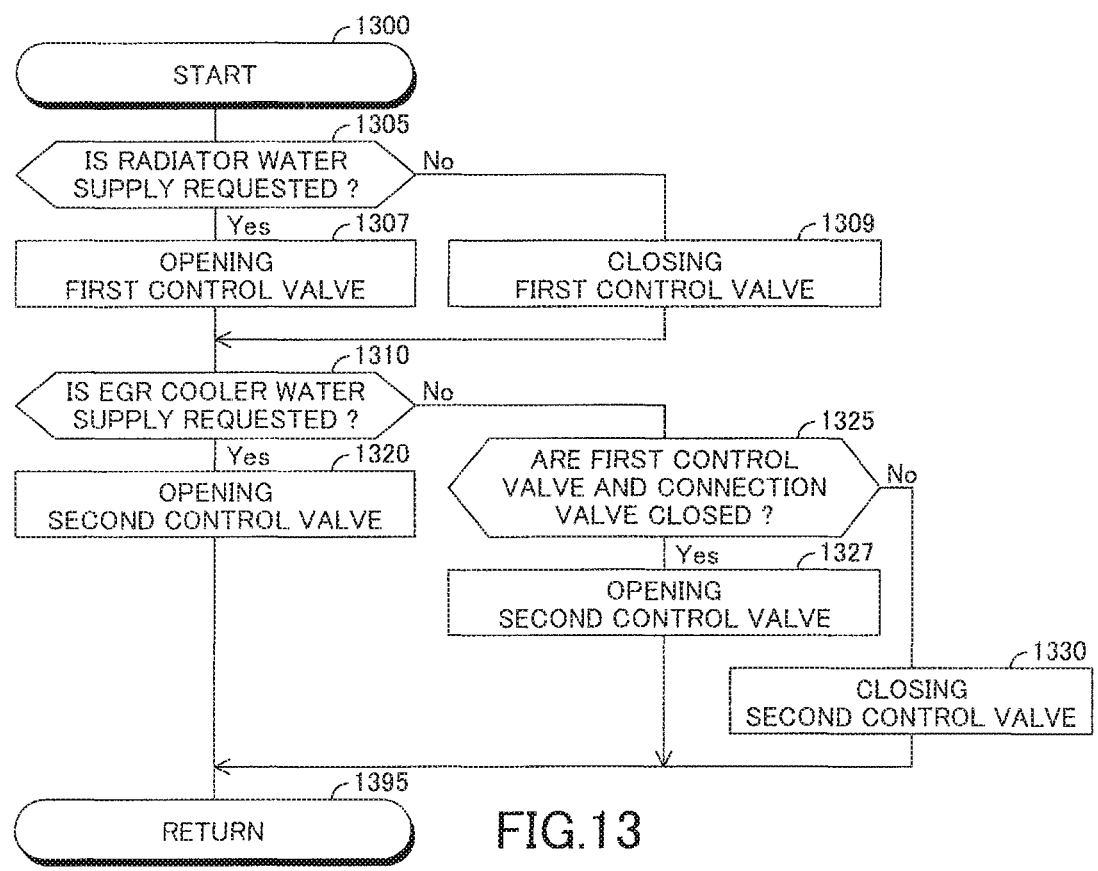
FIG. 13 is a view for showing a flowchart of a routine executed by the CPU.

Further, the CPU is configured or programmed to execute a routine shown by a flowchart in FIG. 13 for opening and closing the first control valve 14r and the second control valve 14e each time the predetermined time elapses. Therefore, at a predetermined timing, the CPU start a process from a step 1300 in FIG. 13 and then, proceeds with the process to a step 1305 to determine whether a radiator water supply for supplying the heat exchanging water to the radiator inner water passage 12W is requested.

In this embodiment, the radiator water supply is requested when the engine water temperature TWeng is equal to or higher than the predetermined water temperature TWeng_th while the engine 11 operates.

When the radiator water supply is requested, the CPU determines "Yes" at the step 1305 and then, executes a process of a step 1307 described below. Then, the CPU proceeds with the process to a step 1310.

Step 1307: The CPU opens the first control valve 14r. In this case, the heat exchanging water is supplied to the radiator inner water passage 12W. Thus, the heat exchanging water is cooled by the radiator 12.

On the other hand, when the radiator water supply is not requested, the CPU determines "No" at the step 1305 and then, executes a process of a step 1309 described below. Then, the CPU proceeds with the process to a step 1310.

Step 1309: The CPU closes the first control valve 14r. In this case, the heat exchanging water is not supplied to the radiator inner water passage 12W.

When the CPU proceeds with the process to the step 1310, an EGR cooler water supply for supplying the heat exchanging water to the EGR cooler inner water passage 13W is requested.

In this embodiment, the CPU determines whether an exhaust gas recirculation operation for introducing the exhaust gas into the combustion chambers should be performed, depending on the engine speed NE and the engine load KL. When an engine operation state (i.e., an operation state of the engine 11) defined by the engine speed NE and the engine load KL is a stat that the exhaust gas recirculation operation should be performed, the EGR cooler water supply is requested.

When the EGR cooler water supply is requested, the CPU determines "Yes" at the step 1310 and then, executes a process of a step 1320 described below. Then, the CPU proceeds with the process to a step 1395 to terminate this routine once.

Step 1320: The CPU opens the second control valve 14e. In this case, the heat exchanging water is supplied to the EGR cooler inner water passage 13W. Thus, the EGR gas is cooled by the heat exchanging water.

When the EGR cooler water supply is not requested, the CPU determines "No" at the step 1310 and then, proceeds with the process to a step 1325 to determine whether the first control valve 14r and the connection valve 61 are closed.

When the second control valve 14e is closed while the first control valve 14r and the connection valve 61 are closed, the heat exchanging water does not flow through the engine water passage. Accordingly, when the first control valve 14r and the connection valve 61 are closed, the CPU determines "Yes" at the step 1325 and then, executes a process of a step 1327 described below. Then, the CPU proceeds with the process to the step 1395 to terminate this routine once.

Step 1327: The CPU opens the second control valve 14e.

On the other hand, when any of the first control valve 14r and the connection valve 61 is open, the CPU determines "No" at the step 1325 and then, proceeds with the process to a step 1330 described below. Then, the CPU proceeds with the process to the step 1395 to terminate this routine once.

Step 1330: The CPU closes the second control valve 14e. In this case, the heat exchanging water is not supplied to the EGR cooler inner water passage 13W. Thus, the EGR gas is not cooled by the heat exchanging water.

Figure 14:
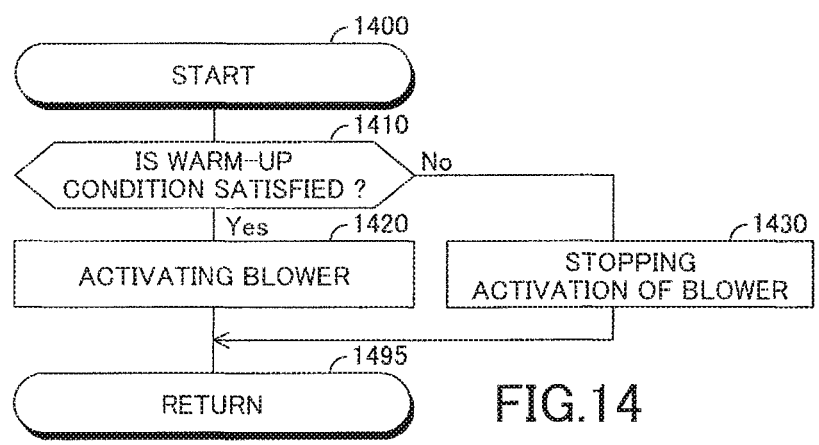
FIG. 14 is a view for showing a flowchart of a routine executed by the CPU.

Further, the CPU is configured or programmed to execute a routine shown by a flowchart in FIG. 14 for controlling the activation of the blower 35 each time the predetermined time elapses. Therefore, at a predetermined timing, the CPU starts a process from a step 1400 in FIG. 14 and then, proceeds with the process to a step 1410 to determine whether the warm-up condition is satisfied.

When the warm-up condition is satisfied, the CPU determines "Yes" at the step 1410 and then, execute a process of a step 1420 described below. Then, the CPU proceeds with the process to a step 1495 to terminate this routine once.

Step 1420: The CPU activates the blower 35. In this case, the air warmed by the heater core 31 is supplied to the interior of the vehicle.

When the warm-up condition is not satisfied, the CPU determines "No" at the step 1410 and then, executes a process of a step 1430 described below. Then, the CPU proceeds with the process to the step 1495 to terminate this routine once.

Step 1430: The CPU stops the activation of the blower 35. In this case, the warm air is not supplied to the interior of the vehicle.

Figure 15:
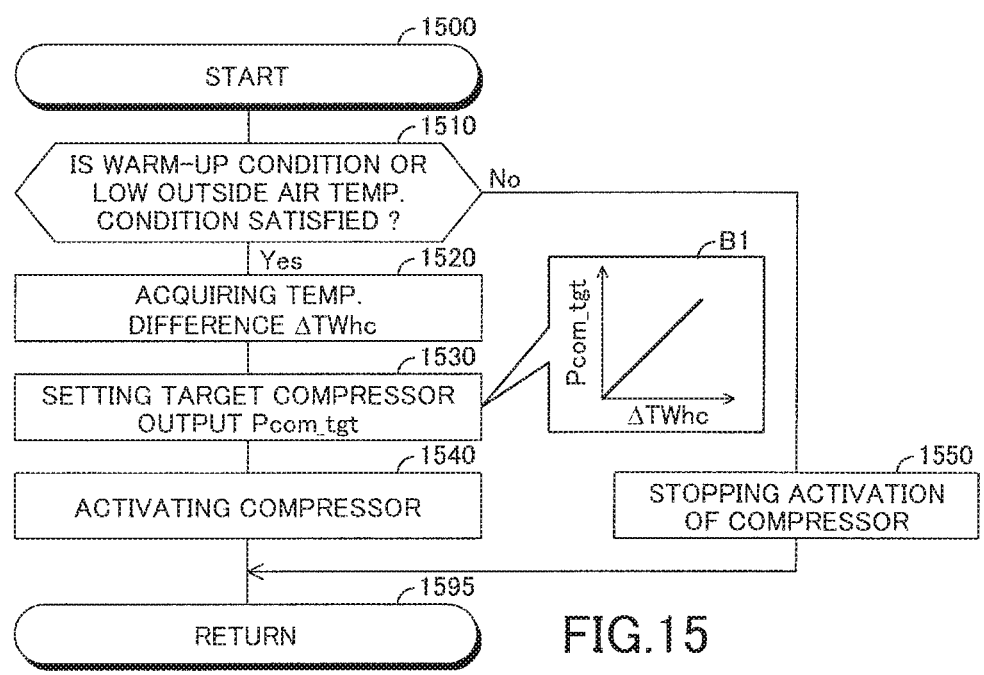
FIG. 15 is a view for showing a flowchart of a routine executed by the CPU.

Further, the CPU is configured or programmed to execute a routine shown by a flowchart in FIG. 15 for controlling the activation of the compressor 335 of the heat pump 33 each time the predetermined time elapses. Therefore, at a predetermined timing, the CPU starts a process from a step 1500 in FIG. 15 and then, proceeds with the process to a step 1510 to determine whether any of the warm-up condition and the low outside air temperature condition is satisfied.

When any of the warm-up condition and the low outside air temperature condition is satisfied, the CPU determines "Yes" at the step 1510 and then, sequentially executes processes of steps 1520 to 1540. Then, the CPU proceeds with the process to a step 1595 to terminate this routine once.

Step 1520: The CPU acquires the core water temperature difference $\Delta TWhc$.

Step 1530: The CPU sets a target compressor output Pcom_tgt on the basis of the core water temperature difference $\Delta TWhc$. The target compressor output Pcom_tgt is a target of the output of the compressor 335. In this case, as shown by a block B1 in FIG. 15, the CPU sets the target compressor output Pcom_tgt such that the target compressor output Pcom_tgt increases as the core water temperature difference $\Delta TWhc$ increases.

Step 1540: The CPU activates the compressor 335 such that the output of the compressor 335 corresponds to the target compressor output Pcom_tgt. In this case, the heat exchanging water is heated by the heat pump 33.

On the other hand, when the warm-up condition and the low outside air temperature condition are not satisfied, the CPU determines "No" at the step 1510 and then, executes a process of a step 1550 described below. Then, the CPU proceeds with the process to the step 1595 to terminate this routine once.

Step 1550: The CPU stops the activation of the compressor 335. In this case, the heat exchanging water is not heated by the heat pump 33.

Figure 16:
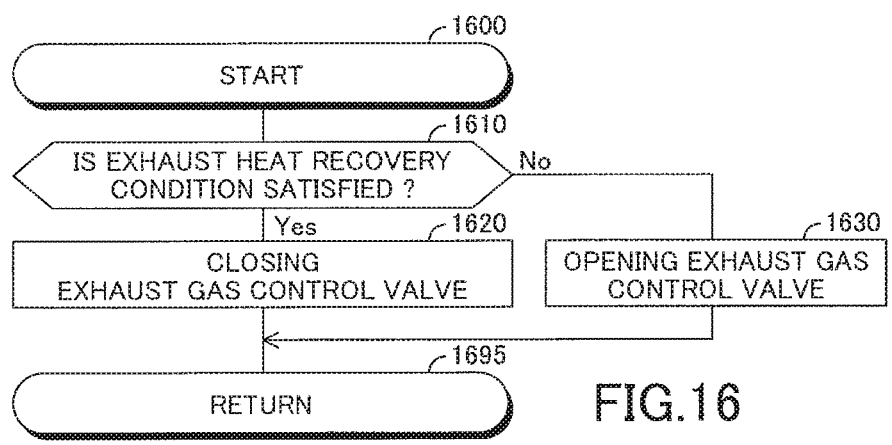
FIG. 16 is a view for showing a flowchart of a routine executed by the CPU.

Further, the CPU is configured or programmed to execute a routine shown by a flowchart in FIG. 16 for opening and closing the exhaust gas control valve 344 of the exhaust heat recovery device 34 each time the predetermined time elapses. Therefore, at a predetermined timing, the CPU starts a process from a step 1600 in FIG. 16 and then, proceeds with the process to a step 1610 to determine whether the exhaust heat recovery condition is satisfied.

When the exhaust heat recovery condition is satisfied, the CPU determines "Yes" at the step 1610 and then, executes a process of a step 1620 described below. Then, the CPU proceeds with the process to a step 1695 to terminate this routine once.

Step 1620: The CPU closes the exhaust gas control valve 344. In this case, the heat exchanging water is heated by the exhaust heat recovery device 34.

On the other hand, when the exhaust heat recovery condition is not satisfied, the CPU determines "No" at the step 1610 and then, executes a process of a step 1630 described below. Then, the CPU proceeds with the process to the step 1695 to terminate this routine once.

Step 1630: The CPU opens the exhaust gas control valve 344. In this case, the heat exchanging water is not heated by the exhaust heat recovery device 34.

The concrete operation of the first embodiment apparatus has been described. Thereby, the system connection operation is performed (the process of the step 1130) when the engine water temperature TWeng is equal to or higher than the core water temperature TWhc, and the engine flow rate Veng is equal to or larger than the heater flow rate Vht (the determination "Yes" at the step 1110). Thus, the temperature of the air (the warm air) supplied to the interior of the vehicle, may be prevented from decreasing when the system connection operation is performed. Thereby, persons in the vehicle are unlikely to feel discomfort.

Second Embodiment

Figure 17:
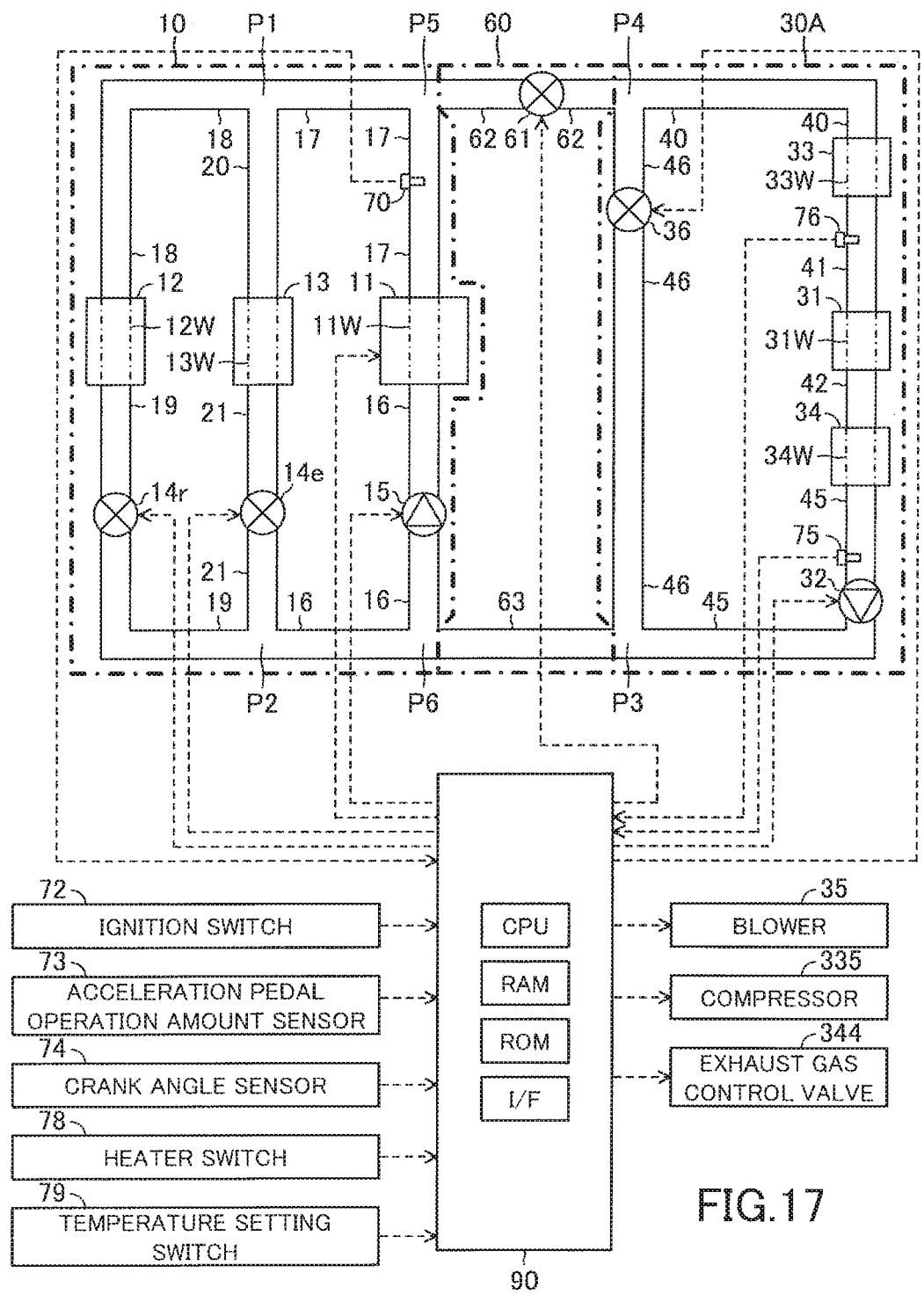
FIG. 17 is a view for showing the heat exchanging system, to which the control apparatus according to the second embodiment of the invention is applied.

Next, the control apparatus of the heat exchanging system according to the second embodiment of the invention, will be described. As shown in FIG. 17, the heat exchanging system, to which the control apparatus according to the second embodiment is applied, includes the cooling system 10, a heater core heating system 30A, and the connection system 60. Hereinafter, the control apparatus according to the second embodiment, will be referred to as "the second embodiment apparatus", and the heater core heating system 30A will be referred to as "the heating system 30A".

The cooling system 10 and the connection system 60 of the second embodiment apparatus are the same as the cooling system 10 and the connection system 60 shown in FIG. 1, respectively.

The heating system 30A includes an exhaust heat recovery device outflow water passage 45 and a circulation water passage 46 in place of the first EHR water passage 43 and the second EHR water passage 44 of the heating system 30. Further, the heating system 30A includes a shut-off valve 36 in contrast to the heating system 30. The exhaust heat recovery device outflow water passage 45 and the circulation water passage 46 are passages, through which the heat exchanging water flows, and are defined by pipes, respectively. Hereinafter, the exhaust heat recovery device outflow water passage 45 will be referred to as "the EHR outflow water passage 45".

The heater pump 32 is provided in the EHR outflow water passage 45. A downstream of the EHR outflow water passage 45 is connected to an end of the circulation water passage 46 at the connection portion P3. The other end of the circulation water passage 46 is connected to the upstream end of the heat pump inflow water passage 40 at the connection portion P4. The downstream end of the heat pump inflow water passage 40 is connected to the inlet of the heat pump inner water passage 33W. The outlet of the heat pump inner water passage 33W is connected to the upstream end of the core inflow water passage 41. The downstream end of the core inflow water passage 41 is connected to the inlet of the core inner water passage 31W. The outlet of the core inner water passage 31W is connected to the upstream end of the core outflow water passage 42. The downstream end of the core outflow water passage 42 is connected to the inlet of the EHR inner water passage 34W. The outlet of the EHR inner water passage 34W is connected to an upstream end of the EHR outflow water passage 45.

The connection inflow water passage 62 of the connection system 60 communicates the portion P5 of the engine outflow water passage 17 with the connection portion P4, at which the circulation water passage 46 and the heat pump inflow water passage 40 are connected to each other. The connection outflow water passage 63 of the connection system 60 communicates the portion P6 of the engine inflow water passage 16 with the connection portion P3, at which the EHR outflow water passage 45 and the circulation water passage 46 are connected to each other.

The shut-off valve 36 is electrically connected to the ECU 90. Activation of the shut-off valve 36 is controlled by the ECU 90 as described later.

The water temperature sensor 75 is provided in the EHR outflow water passage 45. The water temperature sensor 75 detects the temperature TWehr of the heat exchanging water flowing out from the exhaust heat recovery device 34 and sends a signal representing the temperature TWehr to the ECU 90. The ECU 90 acquires the temperature TWehr on the basis of the signal. Hereinafter, the temperature TWehr will be referred to as "the exhaust heat recovery device water temperature TWehr".

Figure 18:
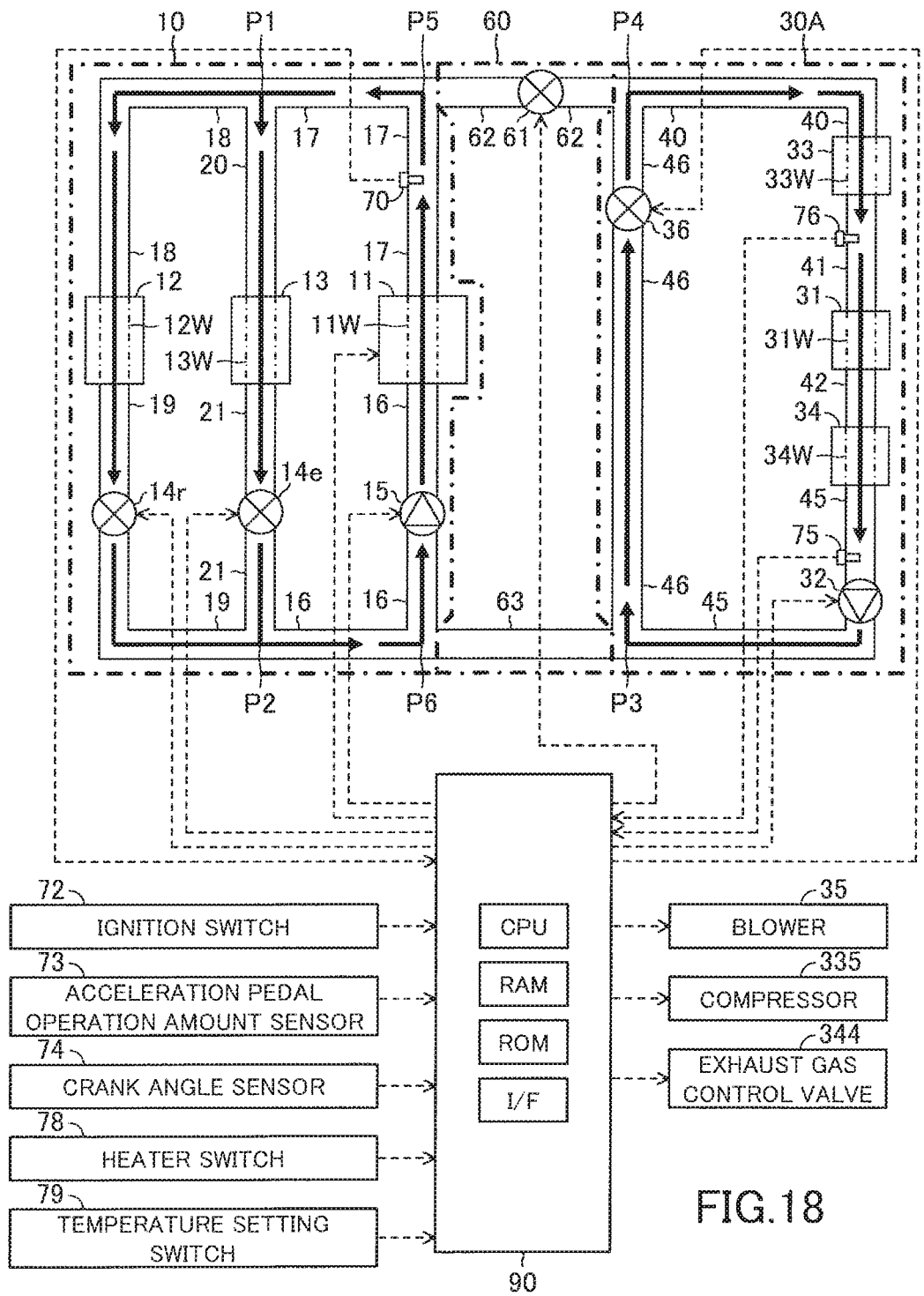
FIG. 18 is a view similar to FIG. 17 and which shows the flow of the heat exchanging water.

When the connection valve 61 is closed (that is, the system connection operation is not performed), the shut-off valve 36 is open, the first control valve 14r is open, and the second control valve 14e is open while the engine pump 15 and the heater pump 32 are activated, the heat exchanging water flows as shown in FIG. 18.

In this case, the flow of the heat exchanging water discharged from the engine pump 15 is the same as the flow of the heat exchanging water described with reference to FIG. 4.

On the other hand, the heat exchanging water discharged from the heater pump 32, flows through the EHR outflow water passage 45, the circulation water passage 46, the heat pump inflow water passage 40, the heat pump inner water passage 33W, the core inflow water passage 41, the core inner water passage 31W, the core outflow water passage 42, the exhaust heat recovery device 34, and the EHR outflow water passage 45 and then, is suctioned into the heater pump 32.

Figure 19:
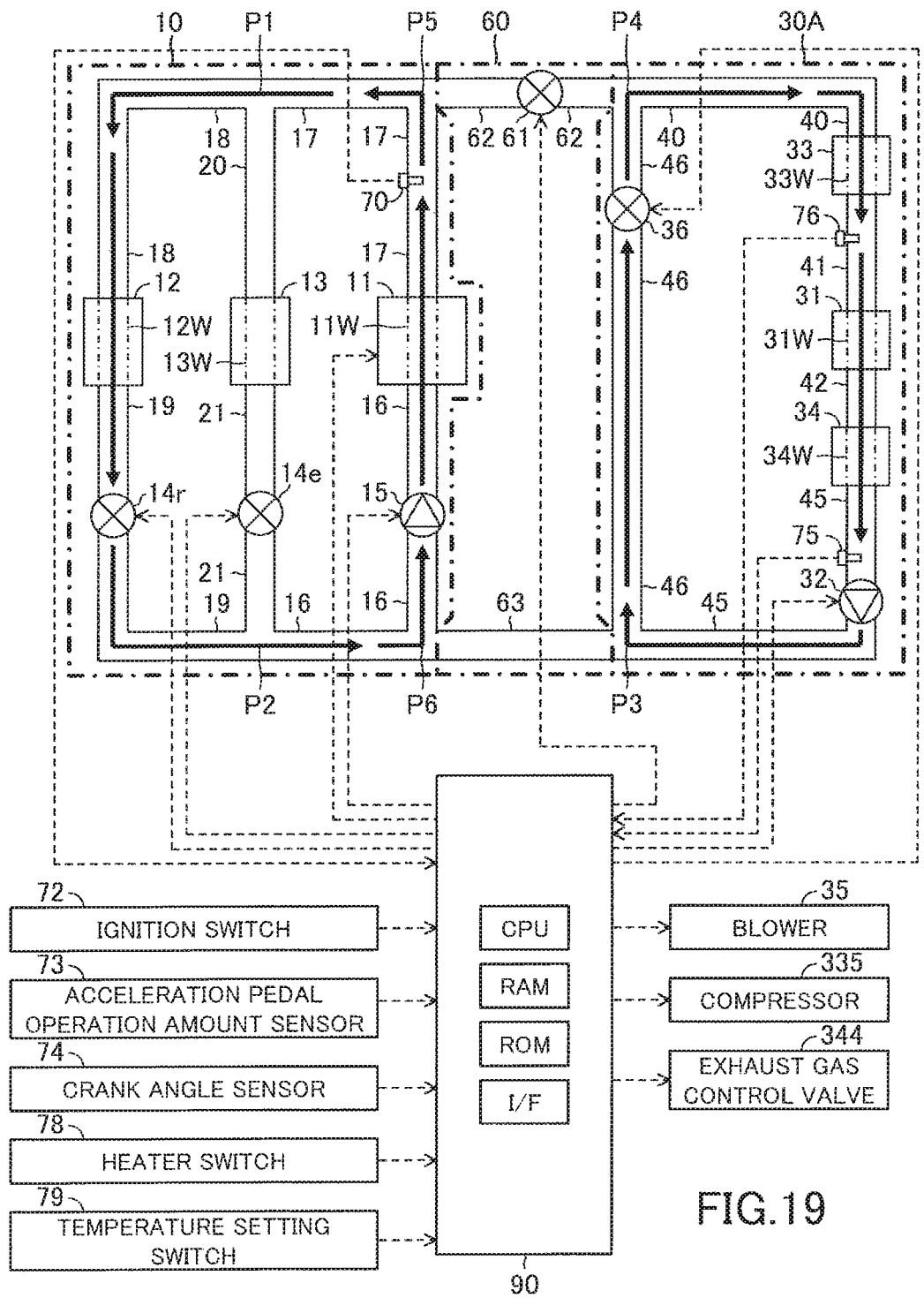
FIG. 19 is a view similar to FIG. 17 and which shows the flow of the heat exchanging water.

When the connection valve 61 is closed (that is, the system connection operation is not performed), the shut-off valve 36 is open, the first control valve 14r is open, and the second control valve 14e is closed while the engine pump 15 and the heater pump 32 are activated, the heat exchanging water flows as shown in FIG. 19.

In this case, the flow of the heat exchanging water in the cooling system 10 and the heating system 30A is the same as the flow of the heat exchanging water described with reference to FIG. 18, except that the heat exchanging water discharged from the engine pump 15 does not flow through the EGR cooler inflow water passage 20, the EGR cooler 13, and the EGR cooler outflow water passage 21.

Figure 20:
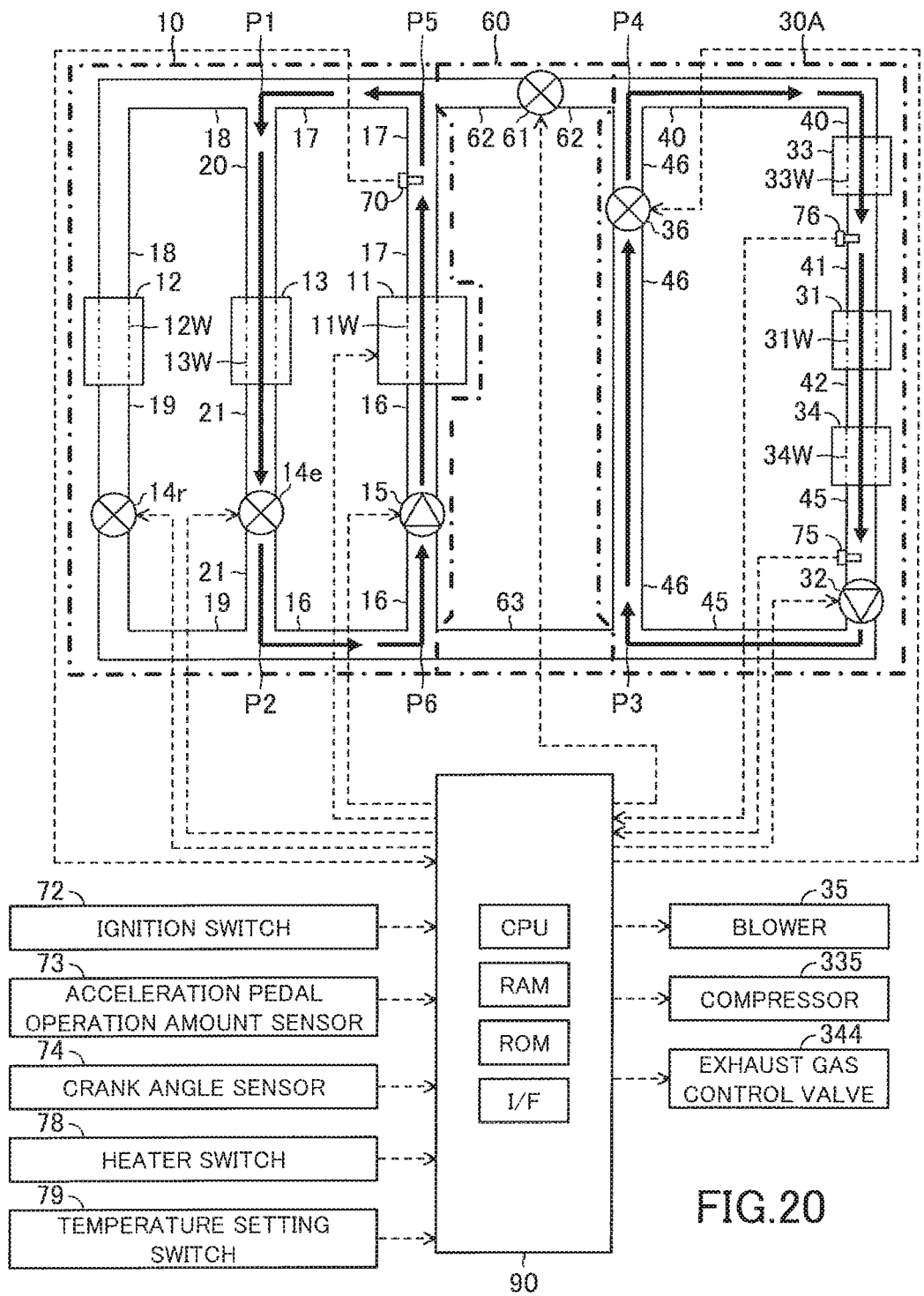
FIG. 20 is a view similar to FIG. 17 and which shows the flow of the heat exchanging water.

When the connection valve 61 is closed (that is, the system connection operation is not performed), the shut-off valve 36 is open, the first control valve 14r is closed, and the second control valve 14e is open while the engine pump 15 and the heater pump 32 are activated, the heat exchanging water flows as shown in FIG. 20.

In this case, the flow of the heat exchanging water in the cooling system 10 and the heating system 30A is the same as the flow of the heat exchanging water described with reference to FIG. 18, except that the heat exchanging water discharged from the engine pump 15 does not flow through the radiator inflow water passage 18, the radiator inner water passage 12W, and the radiator outflow water passage 19.

Figure 21:
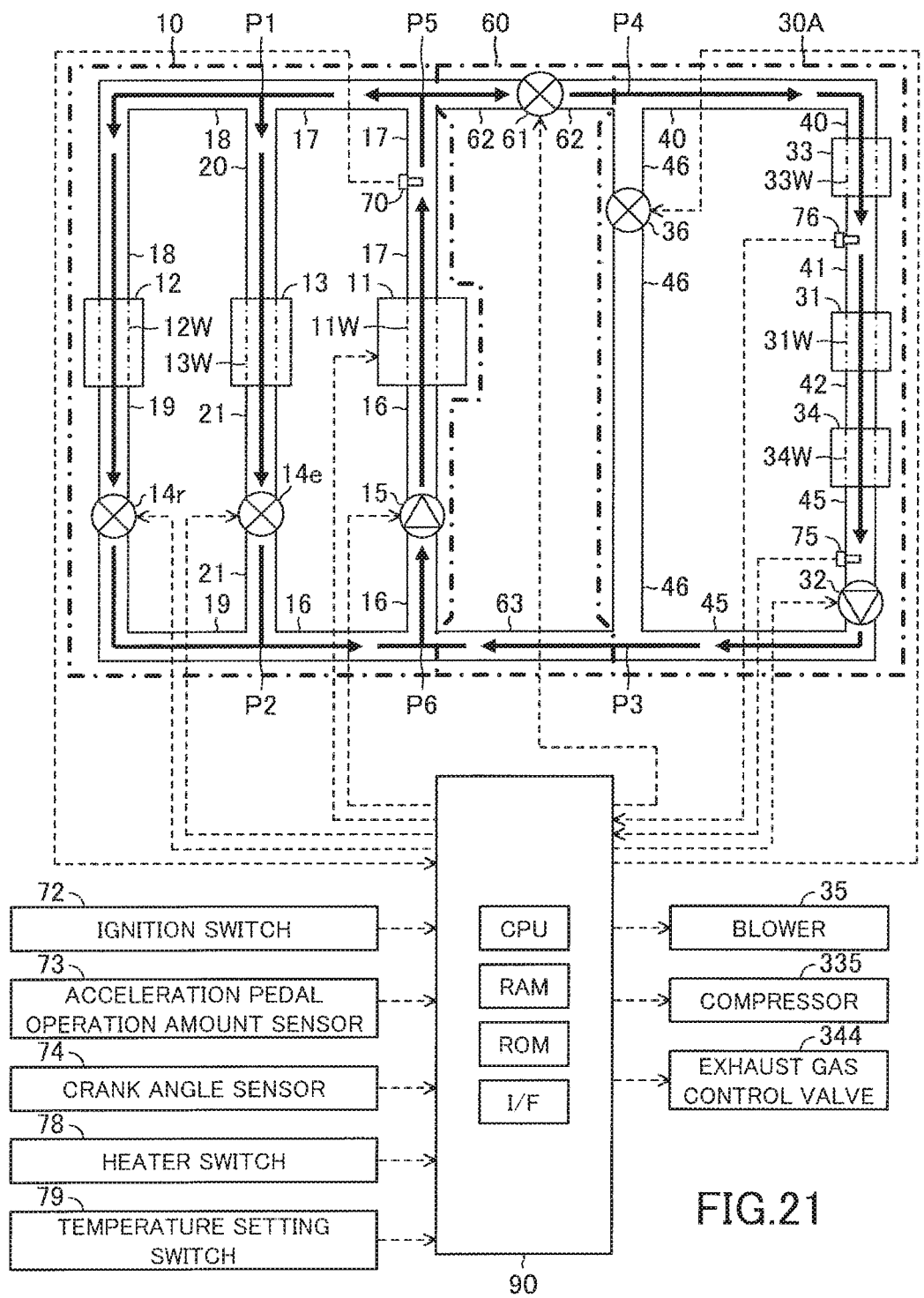
FIG. 21 is a view similar to FIG. 17 and which shows the flow of the heat exchanging water.

When the connection valve 61 is open (that is, the system connection operation is performed), the shut-off valve 36 is closed, the first control valve 14r is open, and the second control valve 14e is open while the engine pump 15 and the heater pump 32 are activated, the heat exchanging water flows as shown in FIG. 21.

In this case, the heat exchanging water discharged from the engine pump 15, flows into the engine inner water passage 11W. A part of the heat exchanging water flowing into the engine outflow water passage 17 through the engine inner water passage 11W, flows through the engine outflow water passage 17 and then, flows into the radiator inflow water passage 18 and the EGR cooler inflow water passage 20. The heat exchanging water flowing into the radiator inflow water passage 18, flows through the radiator inner water passage 12W and the radiator outflow water passage 19 and then, flows into the engine inflow water passage 16. Then, the heat exchanging water flowing into the engine inflow water passage 16, is suctioned into the engine pump 15. The heat exchanging water flowing into the EGR cooler inflow water passage 20, flows through the EGR cooler inner water passage 13W, the EGR cooler outflow water passage 21, and the engine inflow water passage 16 and then, is suctioned into the engine pump 15.

On the other hand, the remaining of the heat exchanging water flowing into the engine outflow water passage 17 through the engine inner water passage 11W, flows through the connection inflow water passage 62 and then, flows into the heat pump inflow water passage 40. The heat exchanging water flowing into the heat pump inflow water passage 40, flows through the heat pump inner water passage 33W, the core inflow water passage 41 the core inner water passage 31W, the core outflow water passage 42, the exhaust heat recovery device 34, and the EHR outflow water passage 45 and then, is suctioned into the heater pump 32.

Further, the heat exchanging water discharged from the heater pump 32, flows through the EHR outflow water passage 45, the connection outflow water passage 63, and the engine inflow water passage 16 and then, is suctioned into the engine pump 15.

Figure 22:
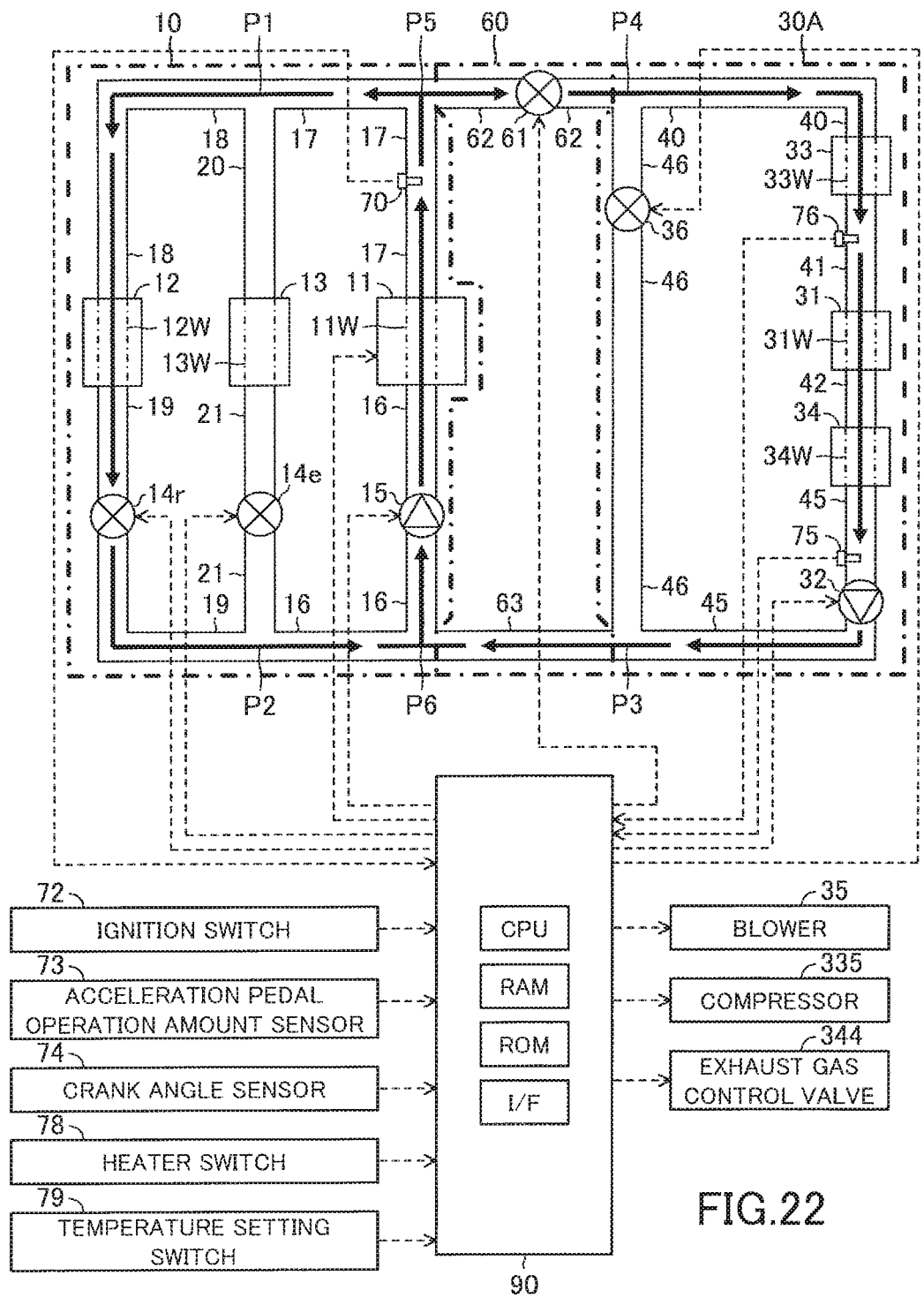
FIG. 22 is a view similar to FIG. 17 and which shows the flow of the heat exchanging water.

When the connection valve 61 is open (that is, the system connection operation is performed), the shut-off valve 36 is closed, the first control valve 14r is open, and the second control valve 14e is closed while the engine pump 15 and the heater pump 32 are activated, the heat exchanging water flows as shown in FIG. 22.

In this case, the flow of the heat exchanging water in the cooling system 10 and the heating system 30A is the same as the flow of the heat exchanging water described with reference to FIG. 21, except that the heat exchanging water discharged from the engine pump 15, does not flow through the EGR cooler inflow water passage 20, the EGR cooler inner water passage 13W, and the EGR cooler outflow water passage 21.

Figure 23:
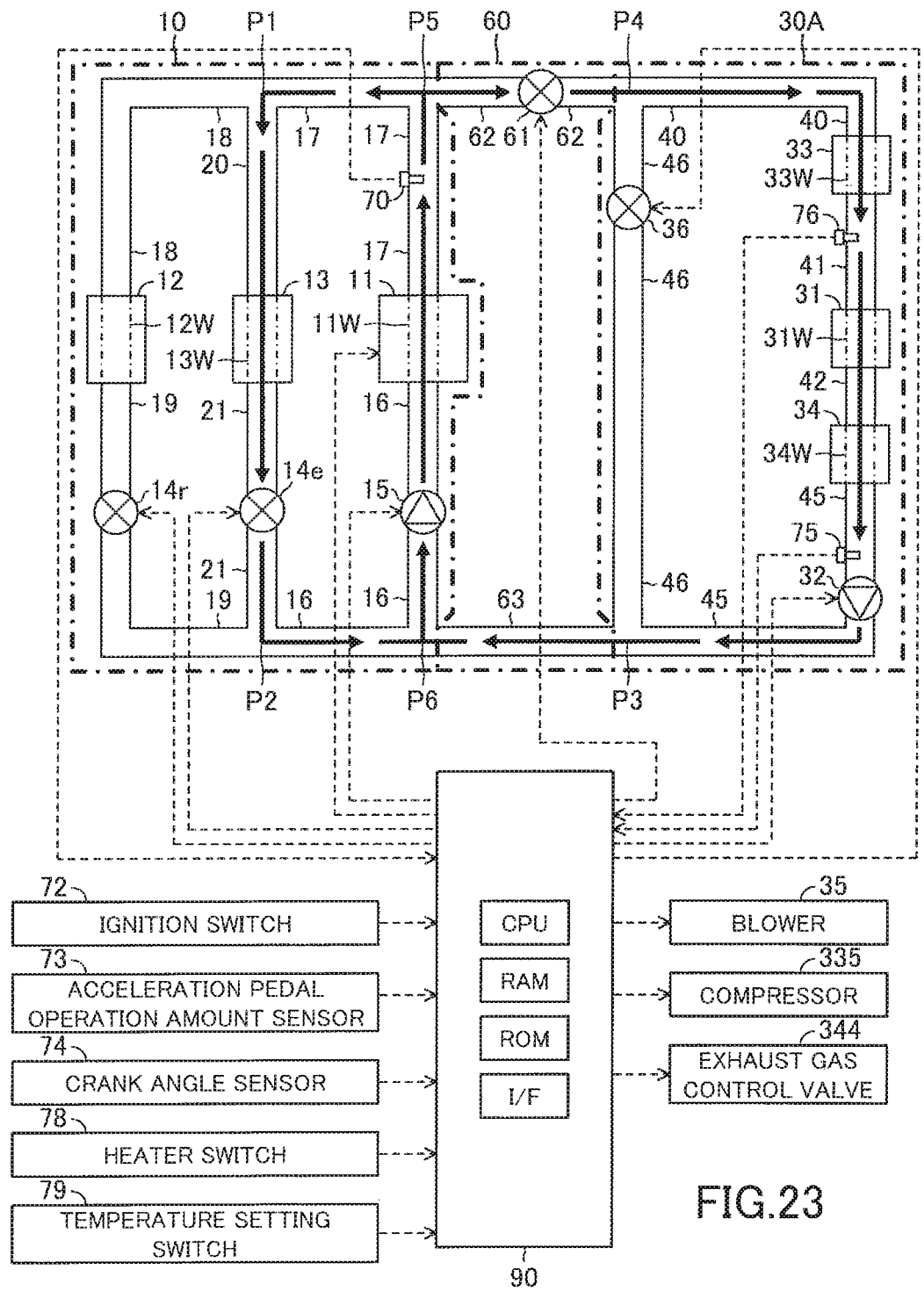
FIG. 23 is a view similar to FIG. 17 and which shows the flow of the heat exchanging water.

When the connection valve 61 is open (that is, the system connection operation is performed), the shut-off valve 36 is closed, the first control valve 14r is closed, and the second control valve 14e is open while the engine pump 15 and the heater pump 32 are activated, the heat exchanging water flows as shown in FIG. 23.

In this case, the flow of the heat exchanging water in the cooling system 10 and the heating system 30 is the same as the flow of the heat exchanging water described with reference to FIG. 21, except that the heat exchanging water discharged from the engine pump 15, does not flow through the radiator inflow water passage 18, the radiator inner water passage 12W, and the radiator outflow water passage 19.

Figure 24:
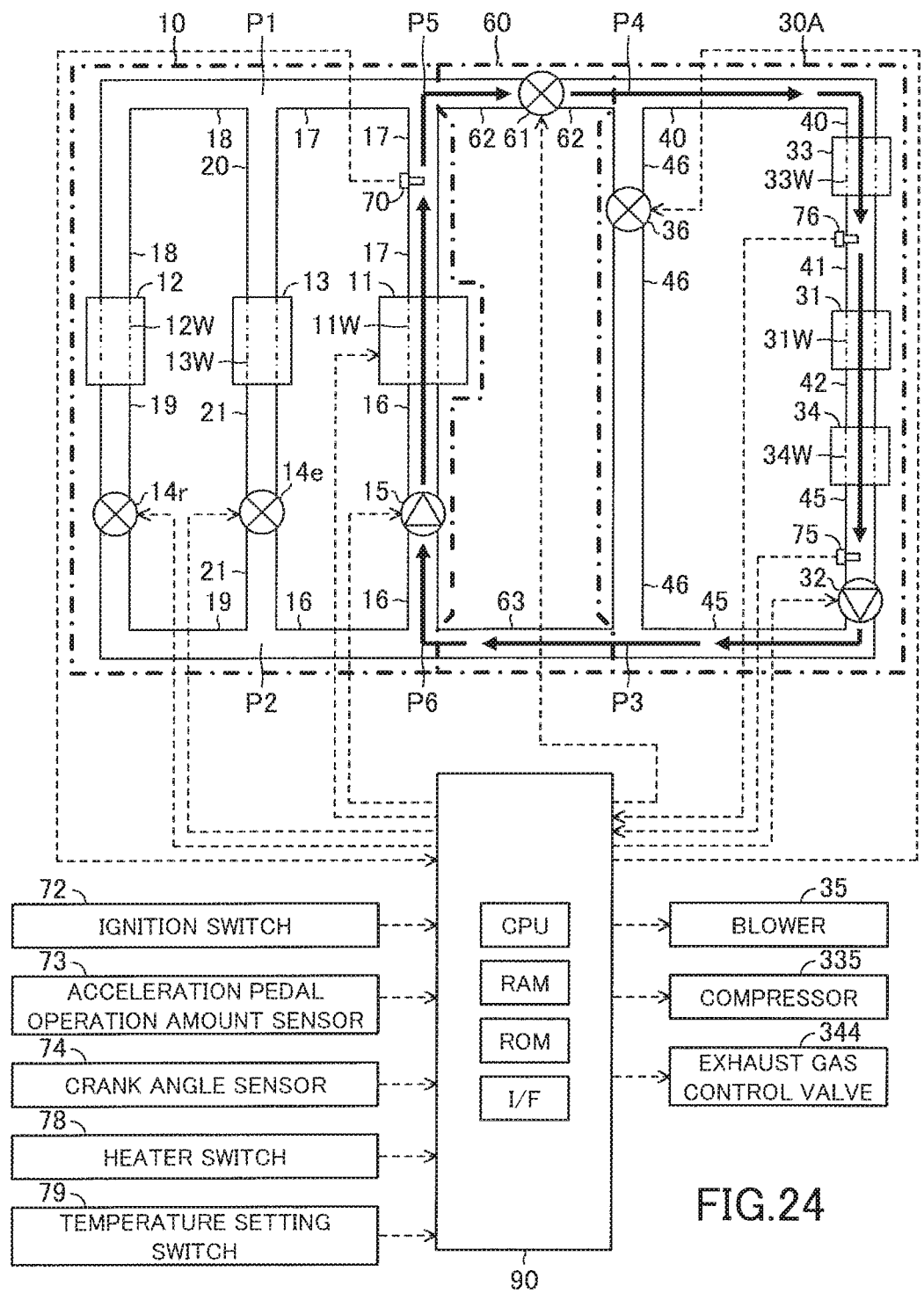
FIG. 24 is a view similar to FIG. 17 and which shows the flow of the heat exchanging water.

When the first control valve 14r and the second control valve 14e are closed while the heat exchanging water flows as shown in FIG. 21, the heat exchanging water flows as shown in FIG. 24. In this case, the flow of the heat exchanging water in the cooling system 10 and the heating system 30A is the same as the flow of the heat exchanging water described with reference to FIG. 21, except that the heat exchanging water discharged from the engine pump 15, does not flow through the EGR cooler inflow water passage 20, the EGR cooler inner water passage 13W, the EGR cooler outflow water passage 21, the radiator inflow water passage 18, the radiator inner water passage 12W, and the radiator outflow water passage 19.

When the first control valve 14r is closed while the heat exchanging water flows as shown in FIG. 22, the heat exchanging water flows as shown in FIG. 24. Also, when the second control valve 14e is closed while the heat exchanging water flows as shown in FIG. 23, the heat exchanging water flows as shown in FIG. 24.

<Summary of Operation of Second Embodiment Apparatus>

Next, a summary of an operation of the second embodiment apparatus, will be described. When the engine circulation condition is satisfied, the second embodiment apparatus cools the engine 11 by activating the engine pump 15 to supply the heat exchanging water to the engine inner water passage 11W.

Further, when the warm-up condition is satisfied, the second embodiment apparatus heats the heater core 31 by activating the heater pump 32 to supply the heat exchanging water to the core inner water passage 31W and warms up the interior of the vehicle by activating the blower 35.

In addition, when the connection condition is satisfied, the second embodiment apparatus performs the system connection operation by opening the connection valve 61 to supply the heat exchanging water flowing in the cooling system 10, to the heating system 30A. In this case, the second embodiment apparatus closes the shut-off valve 36 to shut off the flow of the heat exchanging water through the circulation water passage 46. On the other hand, when the connection condition is not satisfied, the second embodiment apparatus stops the system connection operation by closing the connection valve 61 to stop supplying the heat exchanging water from the cooling system 10 to the heating system 30A. In this case, the second embodiment apparatus opens the shut-off valve 36 to flow the heat exchanging water through the circulation water passage 46.

When the connection valve 61 is open and the shut-off valve 36 is closed while the heat exchanging water flows as shown in FIG. 18, a part of the heat exchanging water flowing in the cooling system 10, flows into the connection inflow water passage 62 from the connection portion P5. Then, the heat exchanging water flows through the connection inflow water passage 62 and then, flows into the heat pump inflow water passage 40 from the connection portion P4.

Similar to the first embodiment apparatus, the second embodiment apparatus performs the system connection operation when the engine water temperature TWeng is equal to or higher than the core water temperature TWhc, and the engine flow rate Veng is equal to or larger than the core flow rate Vhc. Thereby, the temperature of the air (the warm air) supplied to the interior of the vehicle may be prevented from decreasing when the system connection operation is performed. Thus, the persons in the vehicle are unlikely to feel discomfort.

<Concrete Operation of Second Embodiment Apparatus>

Next, a concrete operation of the second embodiment apparatus will be described. The CPU of the ECU 90 of the second embodiment apparatus is configured or programmed to execute a routine shown by a flowchart in FIG. 25 for controlling the activation of the connection valve 61, the activation of the shut-off valve 36, the duty ratio DE of the engine pump 15, and the duty ratio DH of the heater pump 32 each time the predetermined time elapses.

Figure 25:
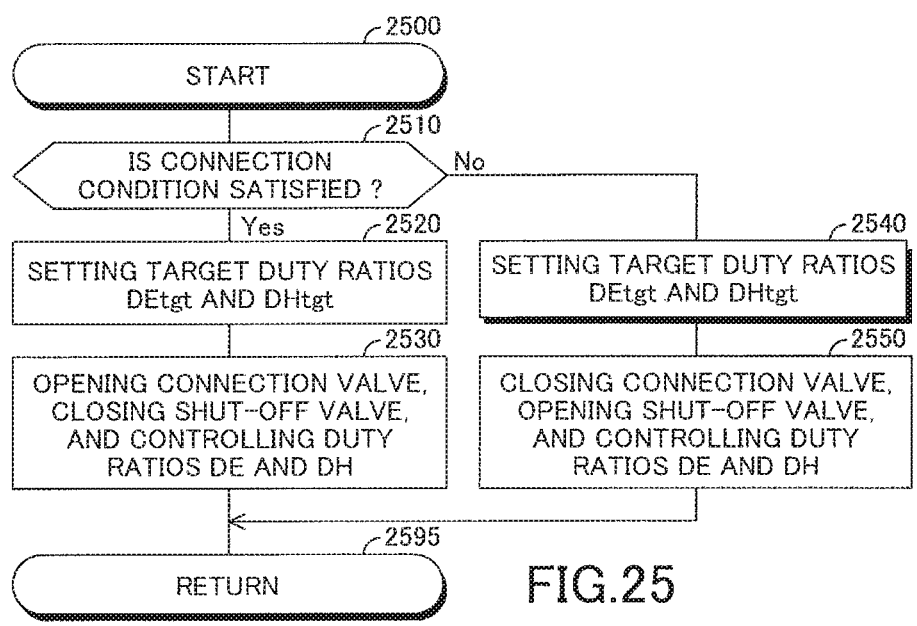
FIG. 25 is a view for showing a flowchart of a routine executed by the CPU of the ECU shown in FIG. 17.

Therefore, at a predetermined timing, the CPU starts a process from a step 2500 in FIG. 25 and then, proceeds with the process to a step 2510 to determine whether the connection condition is satisfied. When the connection condition is satisfied, the CPU determines "Yes" at the step 2510 and then, sequentially executes processes of steps 2520 and 2530 described below. Then, the CPU proceeds with the process to a step 2595 to terminate this routine once.

Step 2520: The CPU applies the engine speed NE, the engine load KL, the core water temperature TWhc, and the vehicle interior set temperature Tset to a look-up table MapDE3(NE, KL, TWhc, Tset) to acquire a duty ratio DE3, and sets the duty ratio DE3 to the target duty ratio DEtgt. In addition, the CPU applies the engine speed NE, the engine load KL, the core water temperature TWhc, and the vehicle interior set temperature Tset to a look-up table MapDH6 (NE, KL, TWhc, Tset) to acquire a duty ratio DH6, and sets the duty ratio DH6 to the target duty ratio DHtgt.

The duty ratio DE3 is a duty ratio DE for activating the engine pump 15 such that the engine flow rate Veng is equal to or larger than the predetermined requested flow rate Veng_req while the system connection operation is performed in the heat exchanging system shown in FIG. 17.

The duty ratio DH6 is a duty ratio DH for activating the heater pump 32 such that the core flow rate Vhc is equal to or larger than the predetermined requested flow rate Vhc_req while the system connection operation is performed in the heat exchanging system shown in FIG. 17.

Step 2530: The CPU opens the connection valve 61, closes the shut-off valve 36, controls the duty ratio DE of the engine pump 15 to the target duty ratio DEtgt, and controls the duty ratio OH of the heater pump 32 to the target duty ratio DHtgt.

When the connection condition is not satisfied at a time of the CPU executing the process of the step 2510, the CPU determines "No" at the step 2510 and then, proceeds with the process to a step 2540. When the CPU proceeds with the process to the step 2540, the CPU executes the routine shown in FIG. 12 to set the target duty ratio DEtgt and the target duty ratio DHtgt. Then, the CPU proceeds with the process to a step 2550.

When the CPU proceeds with the process to the step 2550, the CPU closes the connection valve 61, opens the shut-off valve 36, controls the duty ratio DE to the target duty ratio DEtgt set at the step 2540 (i.e., the routine shown in FIG. 12), and controls the duty ratio DH to the target duty ratio DHtgt set at the step 2540 (i.e., the routine shown in FIG. 12). Then, the CPU proceeds with the process to a step 2595 to terminate this routine once.

Further, the CPU of the second embodiment apparatus is configured or programmed to execute the routines shown in FIGS. 13 to 16 for opening and closing the second control valve 14e, controlling the activation of the blower 35, controlling the activation of the compressor 335 of the heat pump 33, and opening and closing the exhaust gas control valve 344 of the exhaust heat recovery device 34 each time the predetermined time elapses.

The concrete operation of the second embodiment apparatus has been described. Thereby, when the engine water temperature TWeng is equal to or higher than the core water temperature TWhc, and the engine flow rate Veng is equal to or larger than the heater flow rate Vht (the determination "Yes" at the step 2510), the system connection operation is performed (the step 2530). Therefore, the temperature of the air (the warm air) supplied to the interior of the vehicle may be prevented from decreasing when the system connection operation is performed. Thus, the persons in the vehicle are unlikely to feel discomfort.

It should be noted that the present invention is not limited to the aforementioned embodiment, and various modifications can be employed within the scope of the present invention.

For example, the first and second embodiment apparatuses determine that the connection condition is satisfied when the engine circulation condition is satisfied, the warm-up condition is satisfied, the engine water temperature TWeng is equal to or higher than the core water temperature TWhc, and the discharging flow rate Vengp of the heat exchanging water discharged from the engine pump 15 is equal to or larger than the discharging flow rate Vhtp of the heat exchanging water discharged from the heater pump 32.

However, the first and second embodiment apparatuses may be configured to determine that the connection condition is satisfied when the engine circulation condition is not satisfied, the warm-up condition is satisfied, the engine water temperature TWeng is equal to or higher than the core water temperature TWhc, and the discharging flow rate Vengp of the engine pump 15 is equal to or larger than the discharging flow rate Vhtp of the heater pump 32.

Alternatively, the first and second embodiment apparatuses may be configured to determine that the connection condition is satisfied when the engine circulation condition is satisfied, the warm-up condition is satisfied, the engine water temperature TWeng is equal to or higher than the core water temperature TWhc, and the discharging flow rate Vengp of the engine pump 15 is smaller than the discharging flow rate Vhtp of the heater pump 32.

Alternatively, the first and second embodiment apparatuses may be configured to determine that the connection condition is satisfied when the engine circulation condition is not satisfied, the warm-up condition is satisfied, the engine water temperature TWeng is equal to or higher than the core water temperature TWhc, and the discharging flow rate Vengp of the engine pump 15 is smaller than the discharging flow rate Vhtp of the heater pump 32.

Further, the first and second embodiment apparatuses may be applied to the heat exchanging system of a hybrid vehicle including the internal combustion engine and a motor as apparatuses for generating driving force for moving the hybrid vehicle.

Furthermore, the first and second embodiment apparatuses may be applied to the heat exchanging system of a plug-in hybrid vehicle including the internal combustion engine and a motor as apparatuses for generating driving force for moving the hybrid vehicle and including a battery which stores electric power used for activating the motor and may be charged by external power source.

Further, the first and second embodiment apparatuses may be applied to the heat exchanging system of a vehicle in which the engine operation is stopped when a brake pedal is operated, and a moving speed of the vehicle is lower than a predetermined speed, and the engine operation is restarted when the acceleration pedal is operated.

Furthermore, the heater pump 32 of the first embodiment apparatus may be provided in the heat pump inflow water passage 40 or the core inflow water passage 41 in place of the core outflow water passage 42. In addition, the heater pump 32 of the second embodiment apparatus may be provided in the heat pump inflow water passage 40, the core inflow water passage 41, or the core outflow water passage 42 in place of the EHR outflow water passage 45.

What is claimed is:

1. A control apparatus of a heat exchanging system, the heat exchanging system comprising:
    a heater core heating system for heating a heater core for heating air supplied to an interior of a vehicle to warm up the interior of the vehicle by heat exchanging water, which heater core heating system including a heater water passage, through which the heat exchanging water circulates, a heat exchanger for heating the heat exchanging water circulating the heater water passage, and a heater pump for circulating the heat exchanging water through the heater water passage;
    an engine cooling system for cooling an internal combustion engine by the heat exchanging water, which engine cooling system including an engine water passage, through which the heat exchanging water circulates, and an engine pump for circulating the heat exchanging water through the engine water passage; and
    a connection system for connecting the engine water passage and the heater water passage to each other such that the heat exchanging water flows into the heater water passage from the engine water passage, and the heat exchanging water flows out from the heater water passage to the engine water passage,
    wherein the control apparatus comprises an electronic control unit configured to:
    activate the heater pump when warm-up condition that the interior of the vehicle is requested to be warmed up, is satisfied; and
    activate the connection system to connect the engine water passage to the heater water passage when a temperature of the heat exchanging water circulating through the engine water passage, is equal to or higher than the temperature of the heat exchanging water circulating through the heater water passage, and the warm-up condition is satisfied while the engine water passage is not connected to the heater water passage.

2. The control apparatus according to claim 1, wherein the electronic control unit is configured to activate the engine pump and activate the connection system to connect the engine water passage to the heater water passage when the temperature of the heat exchanging water circulating through the engine water passage, is equal to or higher than the temperature of the heat exchanging water circulating through the heater water passage, the warm-up condition is satisfied, and a circulation of the heat exchanging water through the engine water passage is requested while the engine water passage is not connected to the heater water passage.

3. The control apparatus according to claim 2, wherein the electronic control unit is configured to determine that the circulation of the heat exchanging water through the engine water passage, is requested when the temperature of the heat exchanging water in an engine inner water passage is equal to or higher than a predetermined water temperature, the engine inner water passage being formed in the internal combustion engine and defining a part the engine water passage.

4. The control apparatus according to claim 2, wherein the electronic control unit is configured to determine that the circulation of the heat exchanging water through the engine water passage, is requested when a temperature difference between temperatures of parts of the internal combustion engine, is equal to or larger than a predetermined temperature difference.

5. The control apparatus according to claim 4, wherein the electronic control unit is configured to acquire a difference between a temperature of the heat exchanging water cooling an upper area of a cylinder bore a temperature of the heat exchanging water cooling a lower area of the cylinder bore as the temperature difference, the cylinder bore defining a combustion chamber of the internal combustion engine.

6. The control apparatus according to claim 2, wherein the electronic control unit is configured to determine that the circulation of the heat exchanging water through the engine water passage, is requested when the temperature of the heat exchanging water in an engine inner water passage is equal to or higher than a predetermined water temperature, and a temperature difference between temperatures of parts of the internal combustion engine, is equal to or larger than a predetermined temperature difference, the engine inner water passage being formed in the internal combustion engine and defining a part of the engine water passage.

7. The control apparatus according to claim 2, wherein the electronic control unit is configured to activate the connection system to connect the engine water passage to the heater water passage when the temperature of the heat exchanging water circulating through the engine water passage, is equal to or higher than the temperature of the heat exchanging water circulating through the heater water passage, the warm-up condition is satisfied, and a flow rate of the heat exchanging water circulating through the engine water passage is equal to or larger than a flow rate of the heat exchanging water circulating through the heater water passage.

8. The control apparatus according to claim 1, wherein the engine cooling system includes a radiator in the engine water passage, the radiator cooling the heat changing water circulating through the engine water passage, and
    the connection system is configured to connect the engine water passage and the heater water passage such that the heat exchanging water flowing in the engine water passage downstream of the internal combustion engine and upstream of the radiator, flows into the heater water passage.

9. The control apparatus according to claim 1, wherein the heater core heating system includes a heat pump in the heater water passage, the heat pump heating the heat changing water circulating through the heater water passage, and
    the connection system is configured to connect the engine water passage and the heater water passage such that the heat exchanging water flowing through the engine water passage, flows into the heater water passage downstream of the heater core and upstream of the heat pump.

10. The control apparatus according to claim 1, wherein the engine cooling system includes a radiator in the engine water passage, the radiator cooling the heat changing water circulating through the engine water passage,
    the heater core heating system includes a heat pump in the heater water passage, the heat pump heating the heat changing water circulating through the heater water passage, and
    the connection system is configured to connect the engine water passage and the heater water passage such that the heat exchanging water flowing in the engine water passage downstream of the internal combustion engine and upstream of the radiator, flows into the heater water passage downstream of the heater core and upstream of the heat pump.

\* \* \* \* \*